US008636514B1

(12) United States Patent
Luebbe

(10) Patent No.: US 8,636,514 B1
(45) Date of Patent: Jan. 28, 2014

(54) STOCK MARKET SIMULATION TEACHING AID

(76) Inventor: Derek Luebbe, Hendersonville, NC (US)

( * ) Notice: Subject to any disclaimer, the term of this patent is extended or adjusted under 35 U.S.C. 154(b) by 0 days.

(21) Appl. No.: 13/617,193

(22) Filed: Sep. 14, 2012

Related U.S. Application Data

(63) Continuation-in-part of application No. 12/703,274, filed on Feb. 10, 2010, now abandoned, which is a continuation of application No. 11/603,705, filed on Nov. 24, 2006, now abandoned.

(60) Provisional application No. 60/754,005, filed on Dec. 27, 2005.

(51) Int. Cl.
*G09B 19/18* (2006.01)

(52) U.S. Cl.
USPC .......................................... 434/107; 434/108

(58) Field of Classification Search
USPC .............. 434/107, 219, 29–71; 705/35, 36 R
See application file for complete search history.

(56) References Cited

U.S. PATENT DOCUMENTS

| 7,341,455 B2 | 3/2008 | Colaio |
| 7,698,195 B2 * | 4/2010 | Schlunk ...................... 705/36 R |

* cited by examiner

*Primary Examiner* — Timothy A Musselman
(74) *Attorney, Agent, or Firm* — John D. Gugliotta, PE, Esq

(57) ABSTRACT

A web-based stock market simulation educational tool provides a dynamic, interactive, stock market simulation educational tool. Participants create companies, research each other's companies, and manage their own portfolio as they perform bank transactions (loans and Certificates of Deposits) and buy and sell shares which influence the price of each company. Teachers also known as instructors and students also known as participants or investors participate in the educational process. The currant invention will include an investment option for students that mirrors or indexes the entire market within the overall simulation.

21 Claims, 44 Drawing Sheets

Loans and Deposits

Take out loans or make deposits in either three or six day increments.

Reminders:
1. A limit of one loan AND one deposit can be active at any given time.
2. Loans cannot exceed 50% of a user's current portfolio.

Loans/Deposits

[ Loans and Deposits ]

| | |
|---|---|
| Cash Assets | $214.17 |
| Loan/Deposit | Loan |
| Length | 3 day loan – 4.0% Annual Percentage Rate |
| Principal | 0.0 |
| Total | $ |
| Due | Wednesday, June 20th, 2012, 1:22:51 AM |

[ Submit ]

FIG. 34

Verify Your LOAN

Double check this information carefully before proceeding.

You have chosen to make a LOAN of $ 1,300 for 3 days at an interest rate of 4.0 %.

On Wed Jun 20 02:28:54 EDT 2012 $1,304.98 will be automatically subtracted to your Current Assets account.

Do you wish to proceed?

[ Yes ]  [ No ]

| old price | total doll | shares (bought or sold) | New Price Safe 7 | New Price Moderate 5 | New Price Volatile 3 |
|---|---|---|---|---|---|
| 20 | 500 | 25 | 21.58 | 22.22 | 23.70 |
| 50 | 500 | 10 | 51.19 | 51.57 | 52.78 |
| 10 | 500 | 50 | 11.19 | 11.57 | 12.78 |
| 100 | 500 | 5 | 100.68 | 100.95 | 101.59 |
| 200 | 500 | 2.5 | 200.35 | 200.49 | 200.82 |
| 200 | 5000 | 25 | 203.17 | 204.44 | 207.41 |
| 50 | 5000 | 100 | 54.76 | 56.87 | 61.11 |
| 10 | 5000 | 500 | 11.40 | 11.96 | 13.27 |
| 20 | 10000 | 500 | 22.75 | 23.85 | 26.41 |
| 200 | 1000 | -5 | 199.30 | 199.02 | 198.37 |
| 50 | 1000 | -20 | 47.96 | 47.14 | 45.24 |
| 10 | 1000 | -100 | 8.70 | 8.18 | 6.97 |
| 20 | 1000 | -50 | 17.96 | 17.14 | 15.24 |
| 50 | 15000 | -300 | 43.88 | 41.43 | 35.71 |
| 10 | 15000 | -1500 | 8.58 | 8.01 | 6.69 |
| 20 | 15000 | -750 | 17.22 | 16.10 | 13.51 |
| 1 | 15000 | -15000 | 0.86 | 0.80 | 0.67 |
| 200 | 15000 | -80 | 191.84 | 188.57 | 180.85 |
| 31.89 | 31.89 | 1 | 31.93 | 31.98 | 32.09 |

FIG. 37

Pricing Options

This choice allows you to determine the way in which prices will change in your simulation. Read more about these options below.

Select Pricing Options

○ Random Movement
○ Star Ratings
◉ Enter Prices

[Submit]

How share prices move

Every day the prices of all stocks will change. There are two different forces a

| Variables | Score / Star Value | Random / Default Variable | Sim Days = (D) |
|---|---|---|---|
| 15 and -30 | 1 | | D < 12 |
| 22 and -10 | 2 | | |
| 3 and 28 | 3 | 6 and 13 | |
| 39 and -1.5 | 4 | | |
| 50 and -1.5 | 5 | | |
| 19 and -32 | 1 | | 11 < D < 18 |
| 17 and -9 | 2 | | |
| 20 and -3 | 3 | 2 and 11 | |
| 26 and -2 | 4 | | |
| 26 and 7 | 5 | | |
| 12 and -18 | 1 | | 17 < D < 24 |
| 14 and -10 | 2 | | |
| 13 and -3 | 3 | 0 and 9 | |
| 30 and -2 | 4 | | |
| 16 and 4 | 5 | | |

STOCK MARKET SIMULATION TEACHING AID

RELATED APPLICATIONS

The present invention is a Continuation in Part of U.S. Ser. No. 12/703,274 filed on Feb. 10, 20010 now abandoned, which was a Continuation in part of U.S. Ser. No. 11/603,705, filed on Nov. 24, 2006 and now abandoned, and claims benefit of U.S. Provisional Patent 60/754,005 filed on Dec. 27, 2005. Both the '705 application and the '005 application are incorporated by reference as if fully rewritten herein.

BACKGROUND OF THE INVENTION

1. Field of the Invention

The present invention relates generally to educational tools, and, more particularly, to a web-based stock market simulation educational tool.

2. Description of the Related Art

A dynamic, interactive, stock market simulation educational tool is disclosed. Participants create companies, research each other's companies, and manage their own portfolio as they perform bank transactions (loans and Certificates of Deposits) and buy and sell shares which influence the price of each company. Teachers also known as instructors and students also known as participants or investors participate in the educational process. The current invention will include an investment option for students that mirrors or indexes the entire market within the overall simulation.

A search of the prior art did not disclose any patents that read directly on the claims of the instant invention. Of interest, however, is U.S. Pat. No. 7,341,455, issued in the name of Colaio in which a simulation based on understanding the electronic trading of fixed-income financial products is provided. It is meant to engage future floor traders in the technology usage of the trading environment, namely the process of matching of by and sell orders from various participants and understanding the "spread" which is a natural process of this system. Knowing this process and the various spreads that occur make the simulation's participants more experienced traders. However, such a disclosure fail to provide an environment where businesses are created and defined through the development of a detailed business plan, and then traders manage a portfolio as they buy/sell ownership of these business and/or utilize banking options to increase their portfolio.

Consequently, there is a need for a virtual web-based game by which participants create companies, research each other's companies, and manage their own portfolio as they perform bank transactions and buy and sell shares which influence the price of each company in an effort to perform an educational process.

SUMMARY OF THE INVENTION

It is therefore an object of the present invention to provide an improved web-based stock market simulation educational tool.

It is another feature of the current invention whereby teacher enters participants. Team play is also possible. Teachers have choice of either a participant to "create a business and trade" or "trade only".

It is another feature of the current invention whereby teachers get to input the "Environment" of the simulation (time, place, special circumstances, etc.) into a the database (to appear on the Student's Class Page).

It is another feature of the current invention whereby some rules of the simulation cannot be changed. These are communicated to instructor and participants. Some instructors may wish to add additional rules to the simulation. It is another feature of the current invention whereby teacher selects which assignments students will need to complete to define business. These assignments are chosen by clicking a box next to displayed assignments.

It is another feature of the current invention whereby teacher has the option of creating a customized assignment which may be more appropriate for participants' level of understanding.

It is another feature of the current invention whereby participants see selected assignments on the Student Create Page and complete them online to define their business. Answers become part of the database.

It is another feature of the current invention whereby participants and teacher review all business plans online via a database linked Research Page which can show each participant's individual assignments or a collection of all the assignment answers for a particular participant.

It is another feature of the current invention whereby instructor sets the "Start Trading" date and "End Trading" date (the date at which participants can Trade and/or bank).

It is another feature of the current invention whereby Instructor sets a "Price Weighting"—determining the amount of fluctuation that prices will change based on students' buy/sell decisions. Price weightings are either "Volatile", "Moderate", or "Safe".

It is another feature of the current invention whereby instructor selects "Whether he/she will set the share prices for participants on the End Trading date?"

It is another feature of the current invention whereby instructor may optionally select additional dates for price manipulation, falling between the Start Trading and End Trading date.

It is another feature of the current invention whereby instructor can optionally set prices for intended dates. Participants are not aware of these. It is another feature of the current invention whereby Instructor creates a bulletin board announcement. This will be displayed on the Student Class page. It is another feature of the current invention whereby students view the Student Class page which has 3 components: 1) Environment, 2) Rules, and 3) Bulletin Board. Note that the Environment and Rules cannot be changed once the Start Trading date has been reached. The Bulletin Board message can be altered by the instructor as often as needed and is displayed to students with the most recent message from the instructor.

It is another feature of the current invention whereby instructor has option of changing the Bulletin Board message at any time.

It is another feature of the current invention whereby instructor has the option of changing previously entered prices at any time (for future dates of whatever the day's current date is).

It is another feature of the current invention whereby during the simulation, each student has the following options:

a) view his/her portfolio page which includes 1) Current Assets (cash), 2) the fictional companies that are owned, number of shares, current share price, and total asset value of all owned shares, 3) any loans that are due to be repaid, 4) deposits that are due to mature, and 5) Total Assets b) Research Page (to view the business plans of all participants)

c) Create Page (to edit any of their personal answers to the questions, in Essence, altering a business plan d) Trade Now Page (to buy or sell shares of stock; take out a loan, or take out a Certificate of Deposit. (Loans and Certificates of Deposits are taken out for specified periods at specified interest rates.)

e) return to the Class Page

It is another feature of the current invention that provides for an an investment option for students that mirrors (indexes) the entire simulation's market. Thus, making it an index fund for all the stock prices, collectively, in a single game.

It is yet another option of the current invention that includes an optional feature whereby an instructor may enable students to make choices regarding earnings per share, revenues, and expenses for each financial quarter simulated in the simulation. This feature would allow the user to better simulate the choices that an entrepreneur would need to make to adjust to given market within a specific fictional time period. This will allow for a more complex business development plan as students must do more than simply describe their strategy but predict, within reasonable realms, the business flow and cycle of their company over the fictional timeframe of the simulation.

It is another feature of the current invention by which participants (students and teachers) will be able to download the data from a given simulation for use in a student's or teacher's portfolio of the simulation experience.

It is yet another feature of the current invention by which teachers will be able to easily view and monitor each of the students' portfolios in a given simulation.

It is another feature of the current invention by which teachers and students can utilize dynamic graphic features to chart portfolio growth, transaction history, stock prices, and other types of data present in the simulation.

It is yet another feature of the current invention by which the simulation will be able to offer simulated data for Earnings Per Share, and relative indicators of company value to enable mergers and acquisitions to be made by students.

Such aforementioned features allows students to define a business and practice investing skills—two different objectives. Teachers (optionally) can determine the prices. Also, all student buy/sell decisions affect the share prices.

Finally, students can bank (taking out a loan and/or investing in Certificates of Deposit). By using the Internet™, research is easy and more realistic. Participants can play 24 hours a day. By submitting all information online for peer review, the quality of student work is better than simply handing it in to the instructor. Instructors can choose who gets to determine the winning business—the students (through trading) or the instructor (through setting the highest price for one company on the End Trading date). Teachers can set questions at the students' level of understanding, allowing 8 year olds to use the same simulation framework as MBA students. Teachers don't have to use any of the pre-selected assignments if they deem them inappropriate for a specific group. Also provided is the ability for the teacher to be able to alter the bulletin board and prices after the Start Trading date. This allows the instructor to introduce relevant articles into the simulation that could/can affect the share prices of one or more companies. Share prices (for future dates) can also be altered to take into account this new news. Students are allowed to change the answers to assignment questions after the Start Trading date—thus allowing students to alter their business plan. This also provides realism, allowing students to make adjustments to satisfy investors while the fictional time frame is occurring.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is a screen shot of where the instructor selects or creates assignments that participants will compete in;

FIG. 21 is a partial screenshot of one assignment, completed by one student;

FIG. 23 is a partial screenshot of one company's business plan (all assignments);

FIG. 25 is a partial screenshot viewing all the student answers to a particular assignment;

Figure 30:
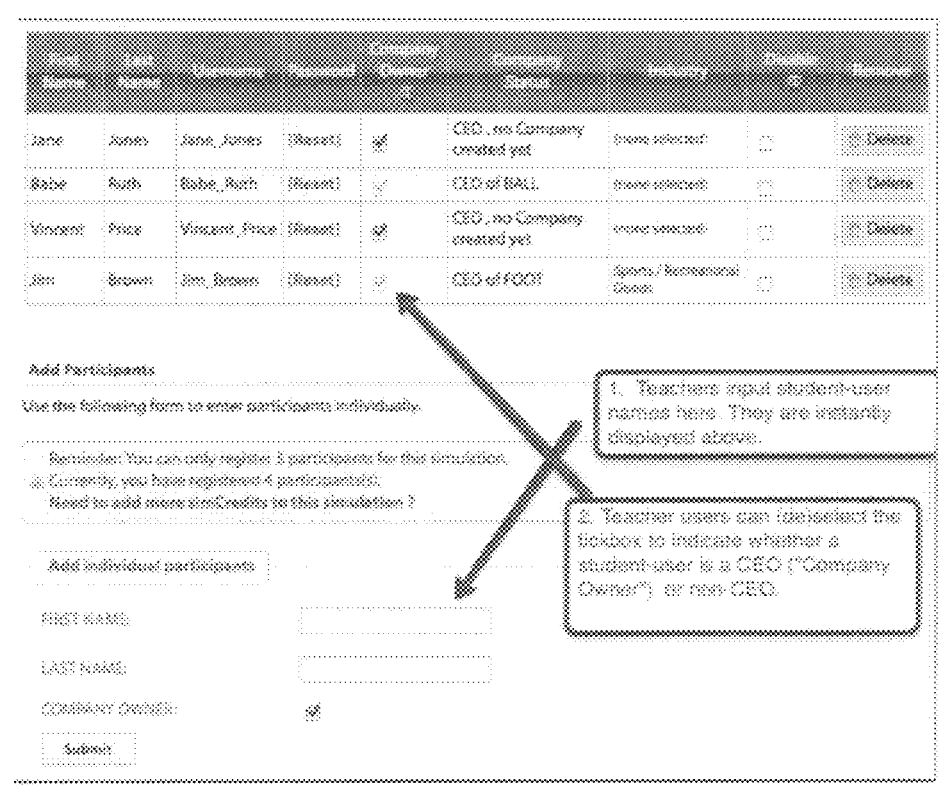

FIG. 30 is a screenshot of teacher-user page to enter student users and determine CEO status;

FIG. 32 is a screenshot of a student CEO's Human Resource page (bottom portion);

Figure 33:
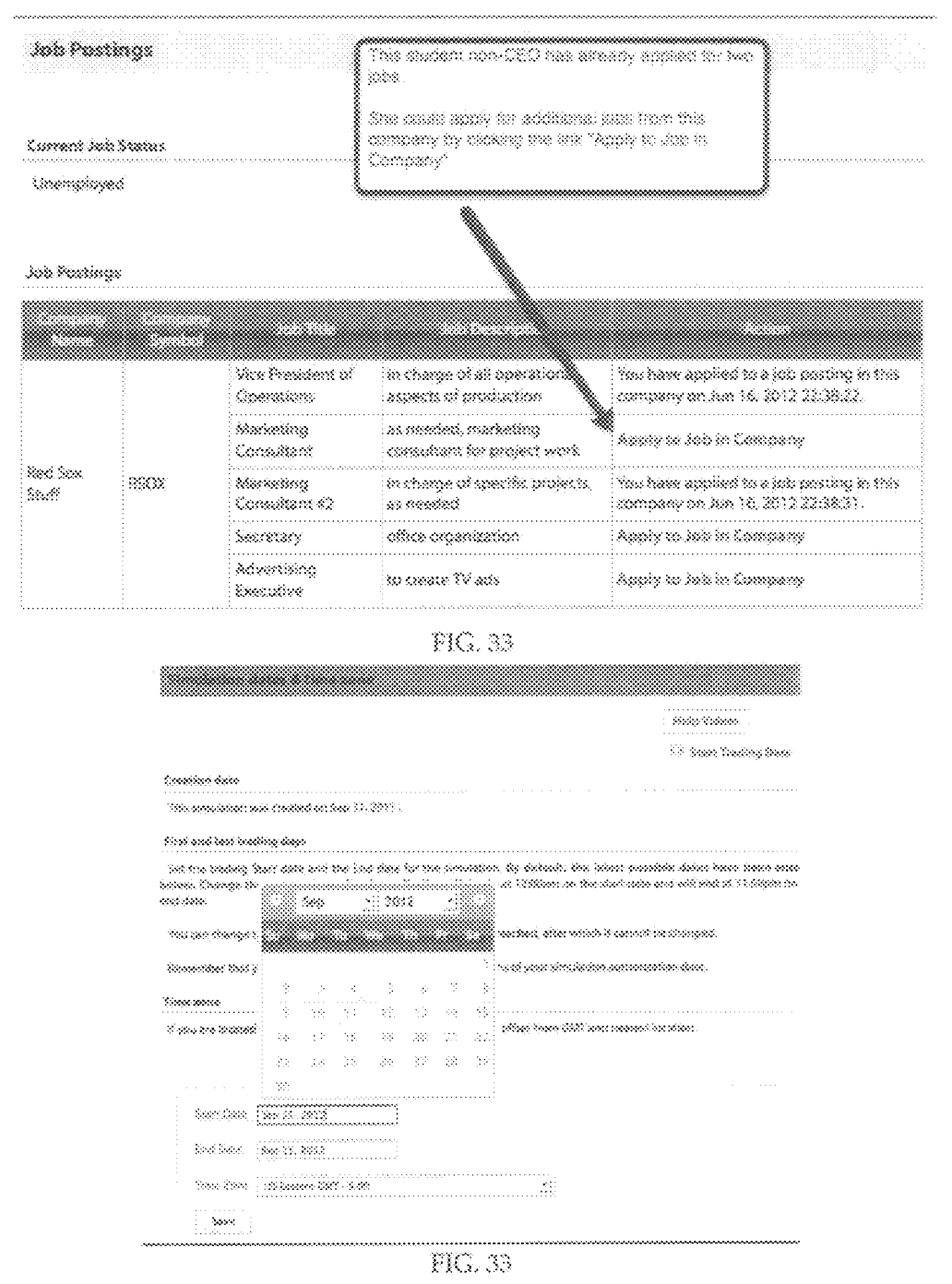

FIG. 33 is a screenshot of a non-CEO student's Human Resource page, depicting how to "Apply" for a job;

FIG. 34 is a screenshot of teacher selecting Start and End Trading Dates;

FIG. 35 is a screenshot of a student's Bank Now page allowing loans and deposits;

Figure 36:
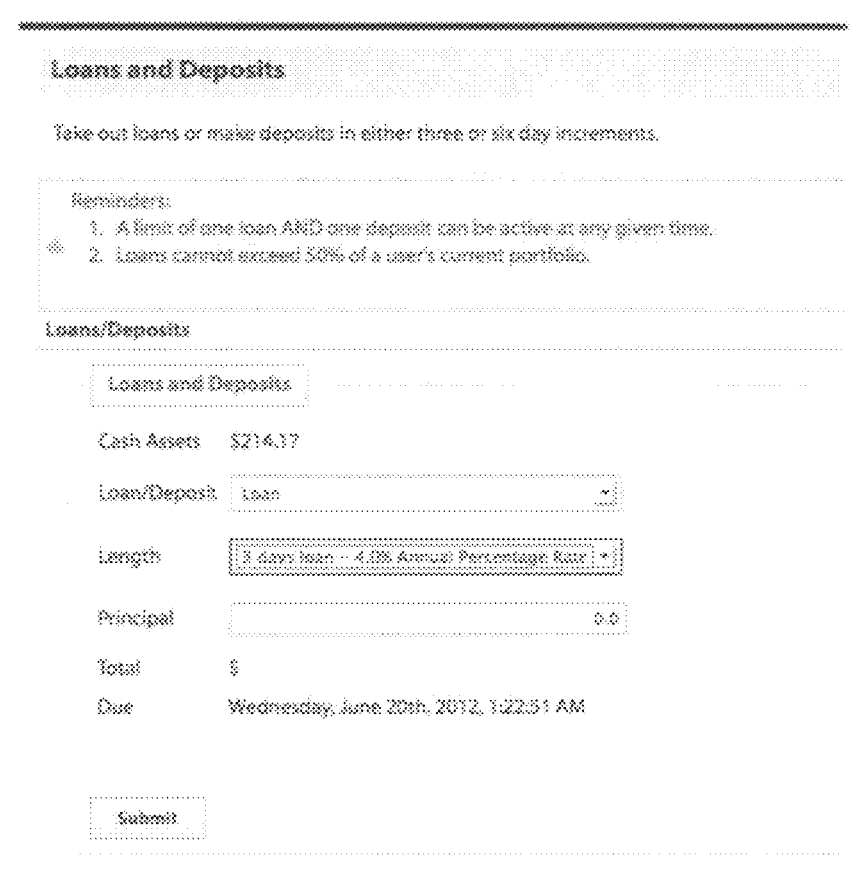

FIG. 36 is a screenshot of student confirmation page of a loan/deposit

FIG. 37 is a chart of price changing variables associated with 'weights';

FIG. 38 is a screenshot of the three options presented to teachers for price-changing;

Figure 39:
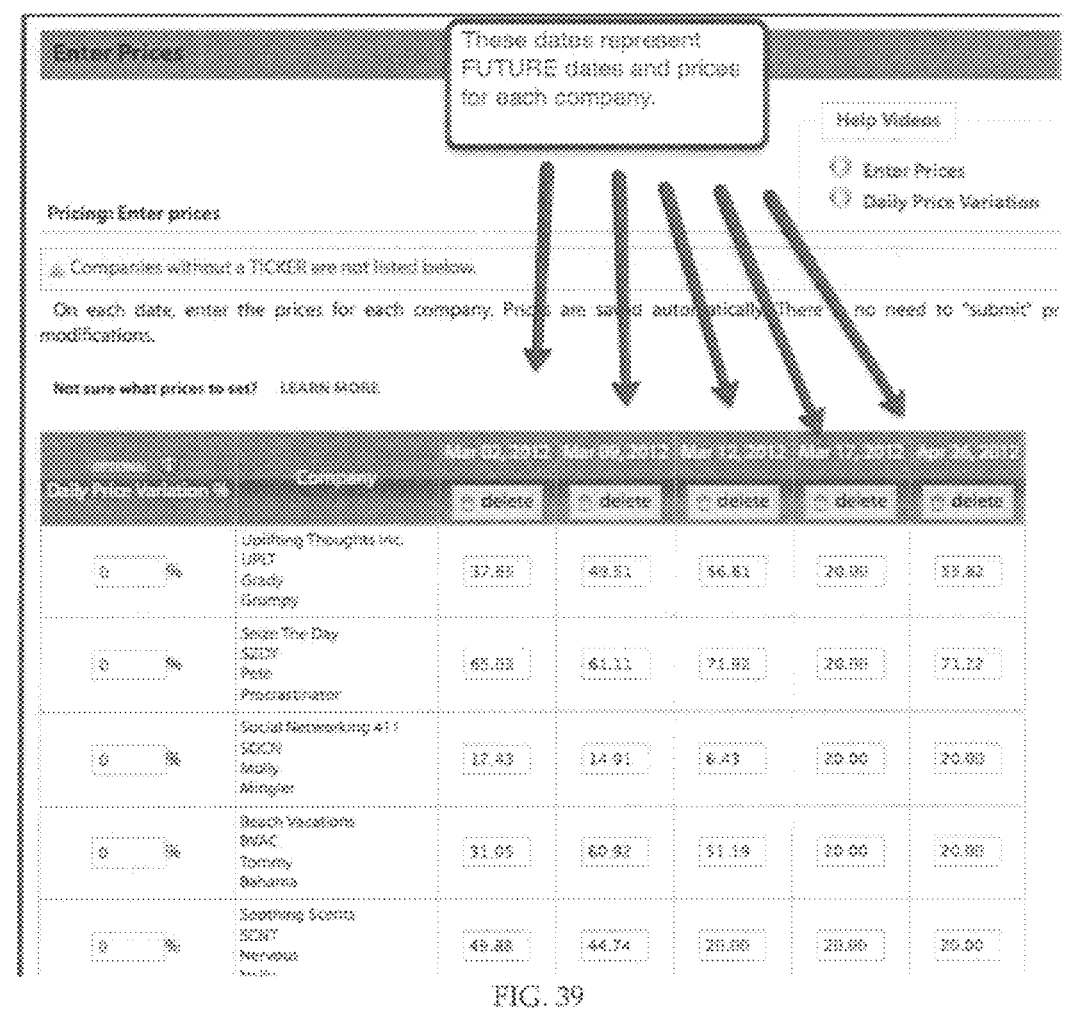

FIG. 39 is a screenshot of teacher's Enter Prices screen;

FIG. 40 is a screenshot of teacher's Star Rating page;

FIG. 41 is a partial chart of Days associated with Star Value variables: Chart continues to up to D<365;

Figures 42, 43:
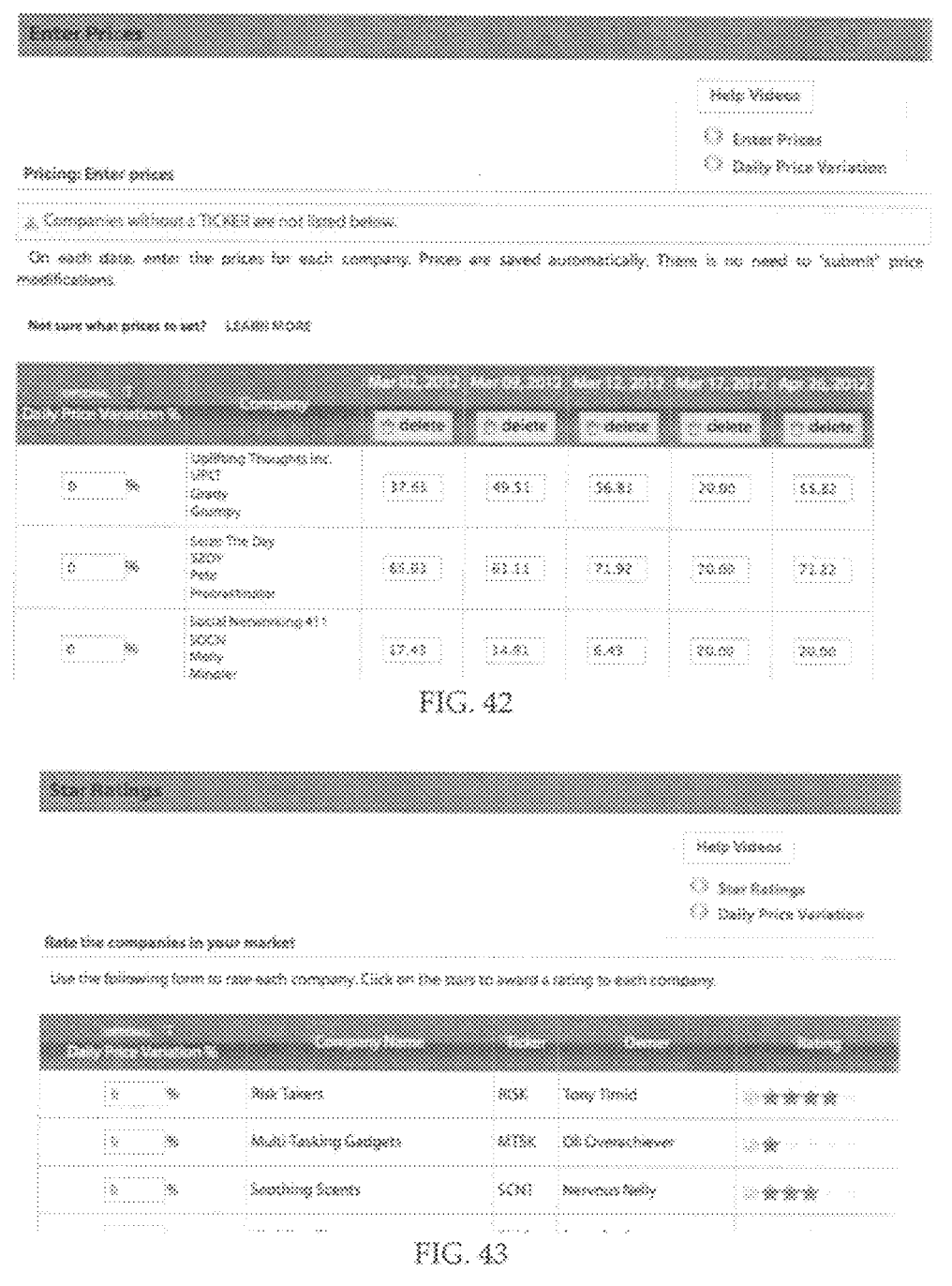

FIG. 42 is a partial teacher screenshot of "Enter Prices" option;

FIG. 43 is a partial teacher screenshot of Star Ratings option;

DESCRIPTION OF THE PREFERRED EMBODIMENTS

The best mode for carrying out the invention is presented in terms of its preferred embodiment, herein depicted within the FIGS. 1 through 48.

1. Detailed Description of the Figures

Figure 1:
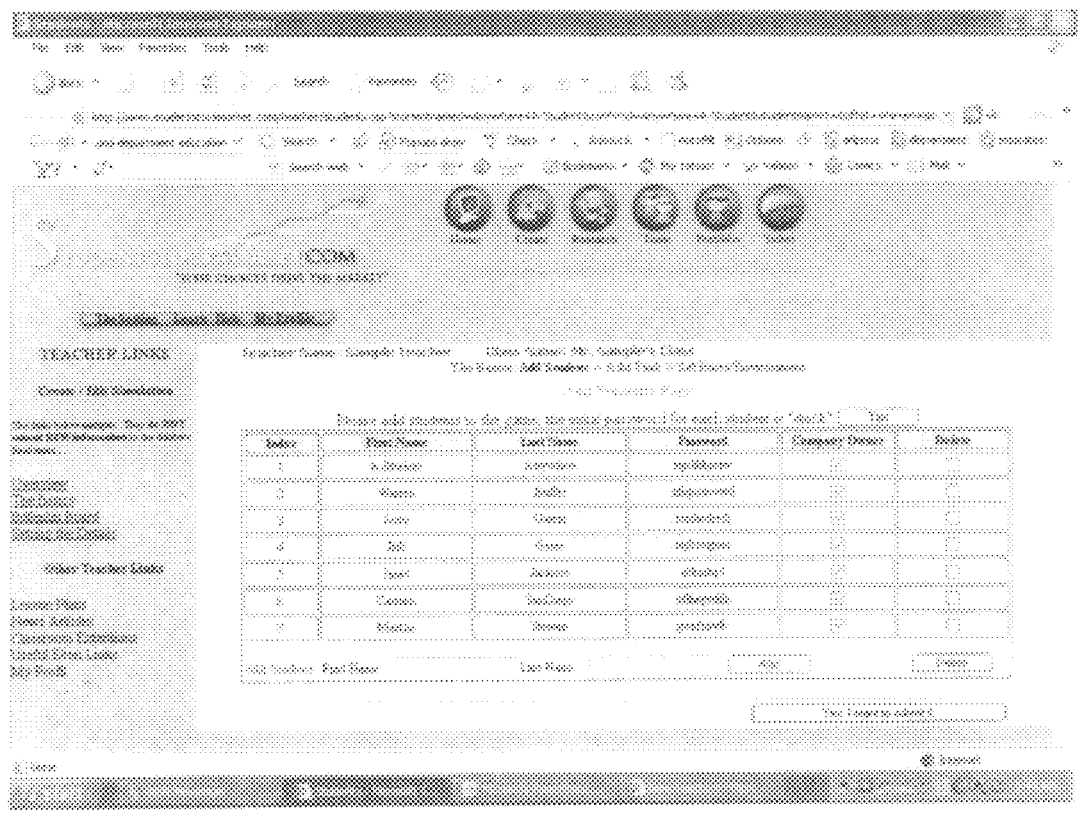
FIG. 1 is a screen shot of where the instructor enters the students according to the preferred embodiment of the present invention.

Referring now to FIG. 1, a screen shot of where the instructor enters the students according to the preferred embodiment of the present invention is disclosed. Said creation occurs when the instructor enters names or associated tagging and clicks upon the "Add" icon.

Figure 2:
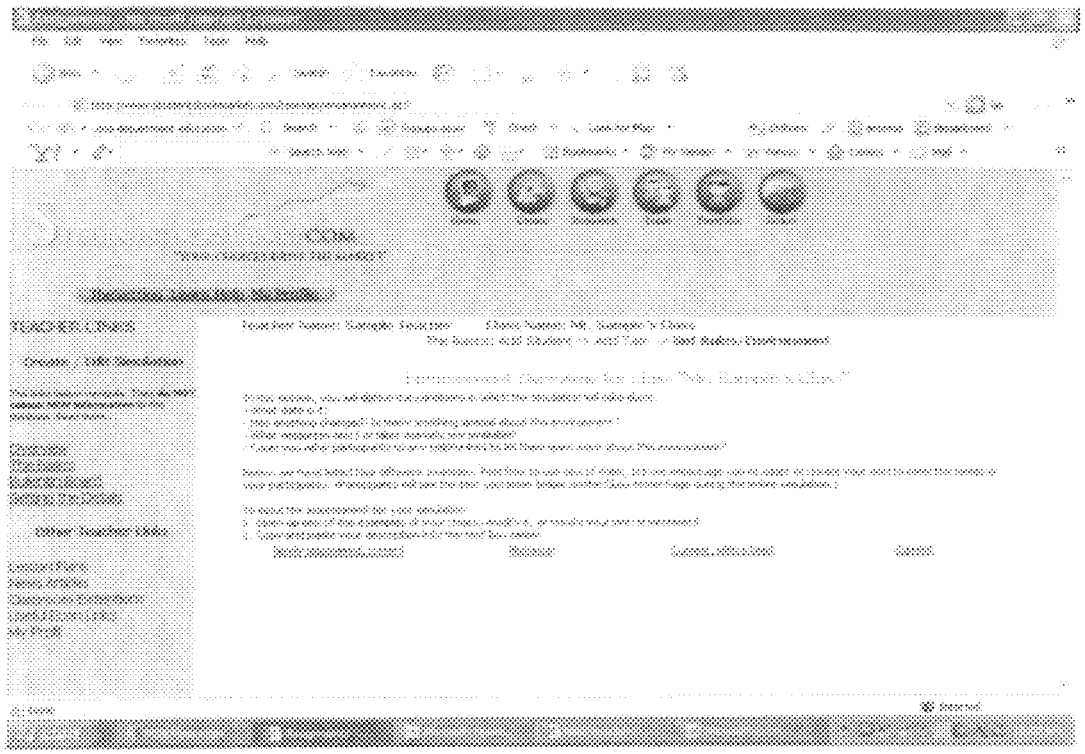
FIG. 2 is a screen shot of where the instructor sets the environment.

Referring next to FIG. 2, a screen shot of where the instructor sets the environment is depicted. The environment tells the students where they will be establishing their businesses— from Chicago in 1930 to today's Taiwan. Sample environments are provided as ideas for the user. Environments may be created from scratch or existing or sample environments can be copy/paste and/or edited.

Figure 3:
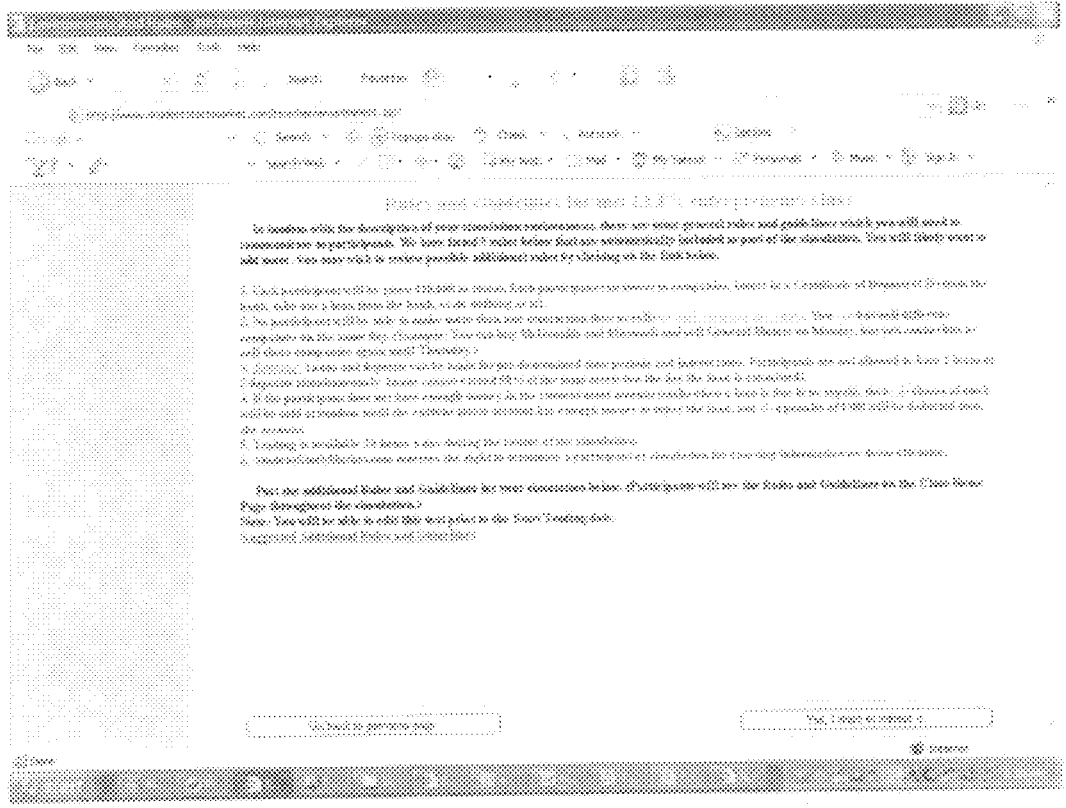
FIG. 3 is a screen shot of where the instructor sets the rules and Guidelines.

Referring now to FIG. 3, a screen shot of where the instructor sets the rules and guidelines is shown. Specific parameters communicated by the instructor are provided at said screen. Parameters include but are not limited to: How long the simulation will last (both in real and fictional time); Any special rules for the participants. Some rules are built into the game. They can't be changed. They are listed here for the instructor and students to see. Links are provided for the instructor to view some possible additional rules. Said rules may or may not be included dependent on the instructors preference. It is envisioned that an alternate embodiment or an option to the preferred embodiment would include an optional feature whereby a teacher may enable students to make choices regarding earnings per share, revenues, and expenses for each financial quarter simulated in the simulation. This feature would allow the user to better simulate the choices that an entrepreneur would need to make to adjust to given market within a specific fictional time period. This will allow for a more complex business development plan as students must do more than simply describe their strategy but predict, within reasonable realms, the business flow and cycle of their company over the fictional time frame of the simulation.

Figure 4:
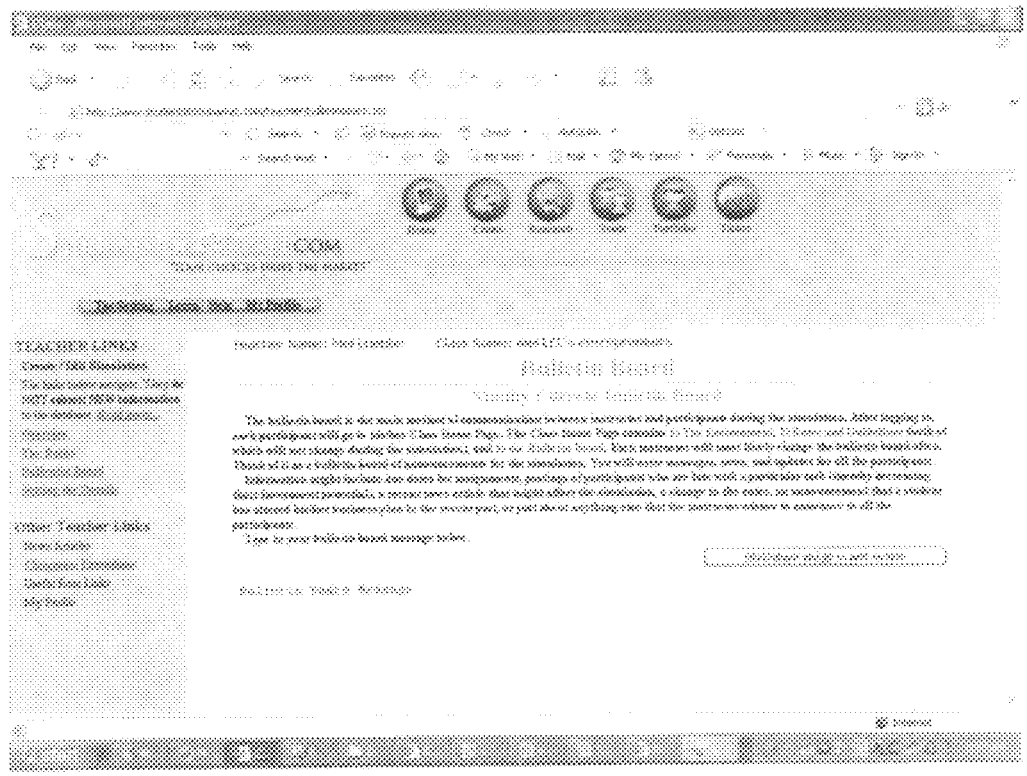
FIG. 4 is a screen shot of where the instructor sets the bulletin board.

Referring next to FIG. 4, a screen shot of where the instructor sets the bulletin board is depicted. The Environment, Rules, and Bulletin Board will appear on the class homepage for all students to see upon login. Once trading begins, only the bulletin board can be changed to present new information. It is a "message board" for the simulation. Instructors can post whatever messages they wish.

Figure 5:
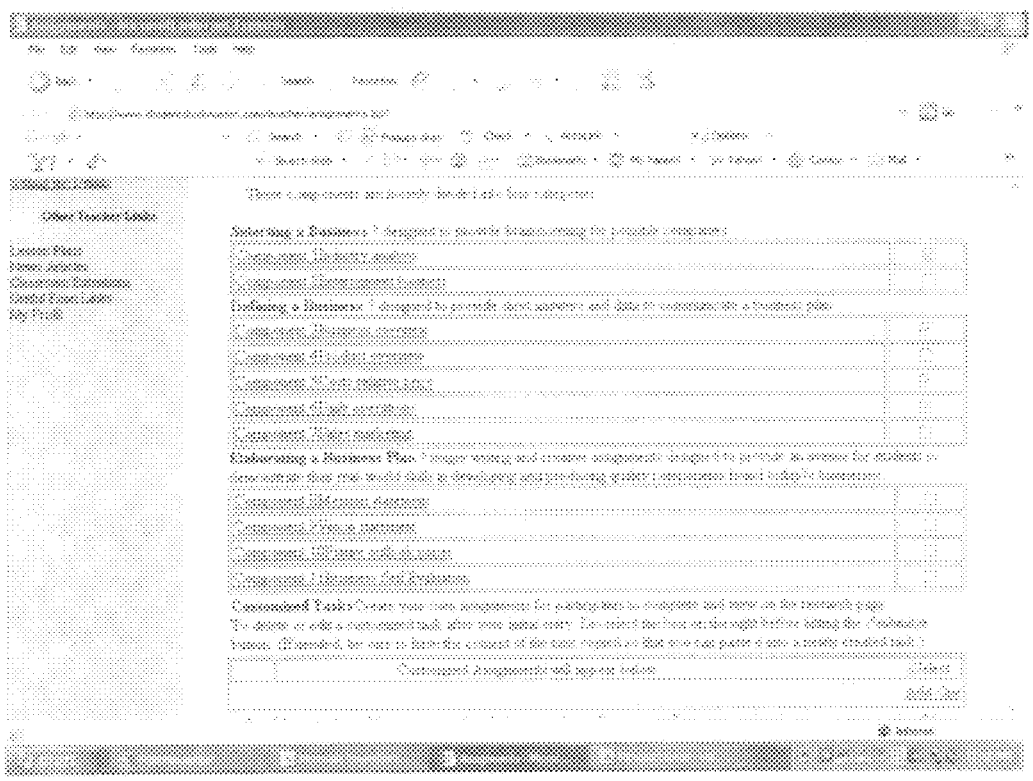

Referring now to FIG. 5, a screen shot of where the instructor selects or creates assignments that participants will compete in is disclosed. Said screen will allow for view ready-made assignments. It is envisioned that one link or icon will allow viewing of all assignments for ease of viewing. Said screen will also allow instructor to include an individual assignment, or customized assignments can be created on an optional basis. Teachers will be able to easily view and monitor each of the students' portfolios in a given simulation.

Figure 6:
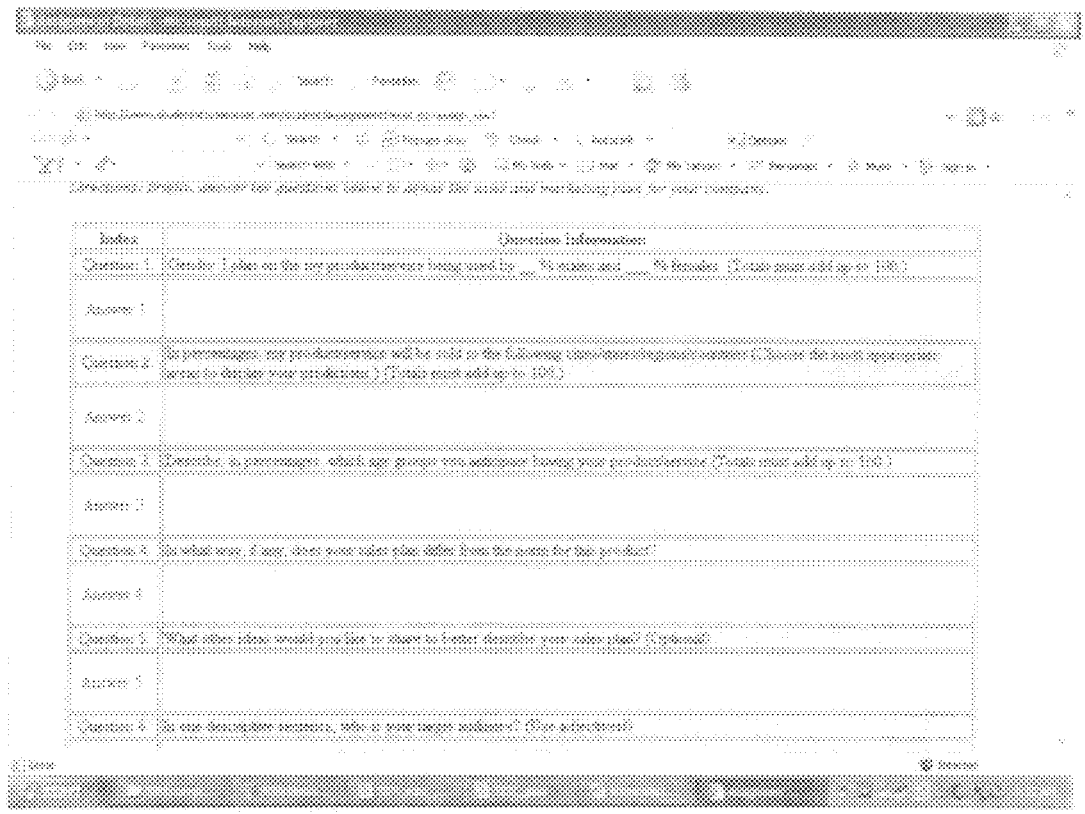
FIG. 6 is a screen shot of where students anser questions in the role of CEO of their company, thus detailing how their business will be successful.

Referring next to FIG. 6, a screen shot of where students anser questions in the role of CEO of their company, thus detailing how their business will be successful is depicted. It is envisioned that actual sample assignments can be viewed from a related Internet based site or sites.

Figure 7:
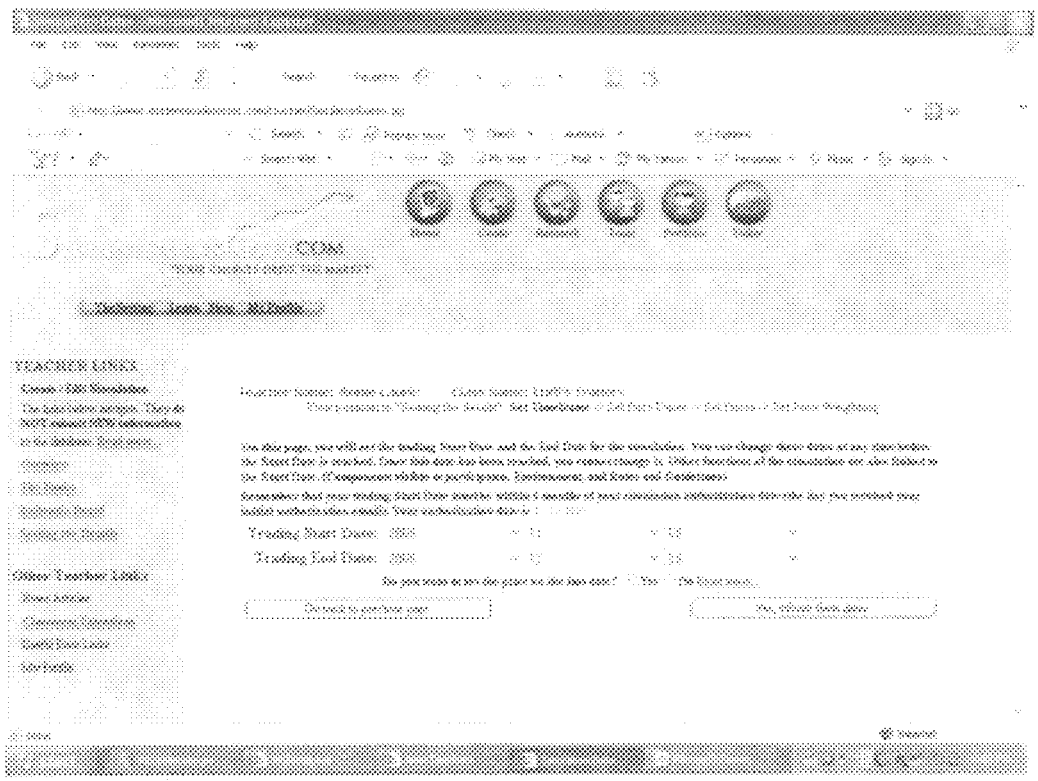
FIG. 7 is a screen shot of where the instructor sets the time frame of the Simulation.

Referring now to FIG. 7, a screen shot of where the instructor sets the time frame of the simulation is shown. The instructor selects the days that trading will start and stop. Also available for selection and associated answering is the question of whether or not the instructor wishes to set the prices on the last date?" Selecting "'yes" allows the instructor to enter prices for each company on the last date of trading. Selecting "no" allows the participants' buy/sell decisions be the final factor in determining which company ends up with the greatest share price. Both students and teachers will be able to download the data from a given simulation for use in a student's or teacher's portfolio of the simulation experience.

Figure 8:
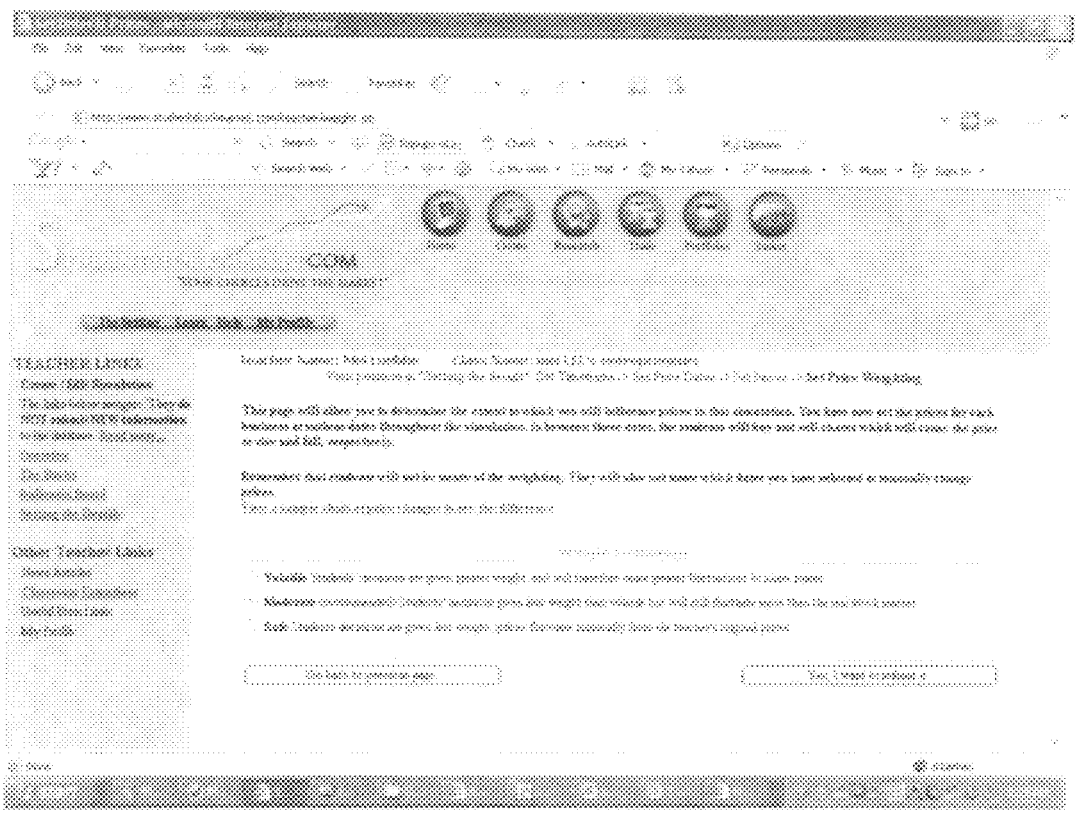
FIG. 8 is a screen shot of where the instructor sets a price "weighting" structure.

Referring now to FIG. 8, a screen shot of where the instructor sets a price "weighting" structure is disclosed. Every student's buy/sell decision will affect the share price of a stock. Said screen allows the instructor to select just "how much" weight each trade will have. The three options available for selection are VOLATILE where prices move a lot; MODERATE; and SAFE where prices move minimally. The invention will include an investment option for students that mirrors (indexes) the entire simulation's market. Thus, making it an index fund for all the stock prices, collectively, in a single game. The simulation will be able to offer simulated data for Earnings Per Share, and relative indicators of company value to enable mergers and acquisitions to be made by students.

Figure 9:
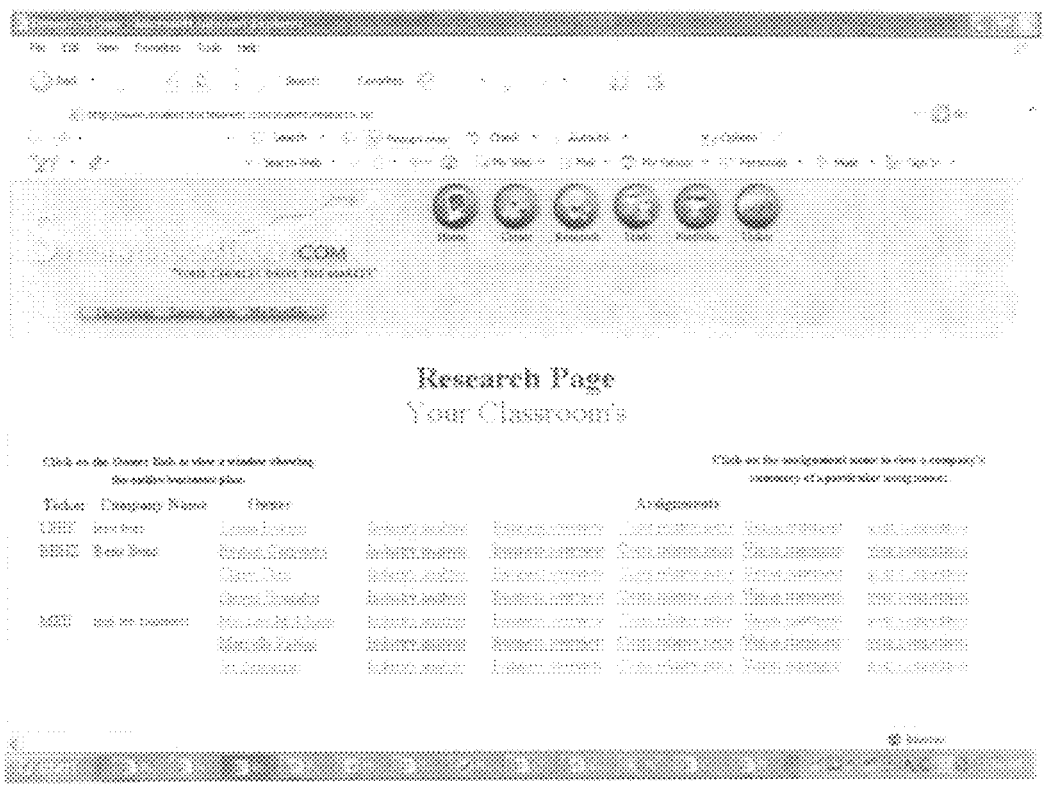
FIG. 9 is a screen shot of where the participants' answers are submitted to an online database. A students and instructor are able to research all companies.

Referring now to FIG. 9, a screen shot of where the participants' answers are submitted to an online database is depicted. All students and instructor are able to research all companies. Instructors and participants are permitted to select an individual assignment or are able to select a specific participant or student to view the student's answers to all assignments. After the students complete assignments, the instructor can optionally decide whether or not to set some "base prices" at various dates. If no dates/prices are set, prices start at $20.00 and move only on buying and selling. If the instructor wishes to set some prices, the process is described herein below in FIG. 10 and FIG. 11.

Figure 10:
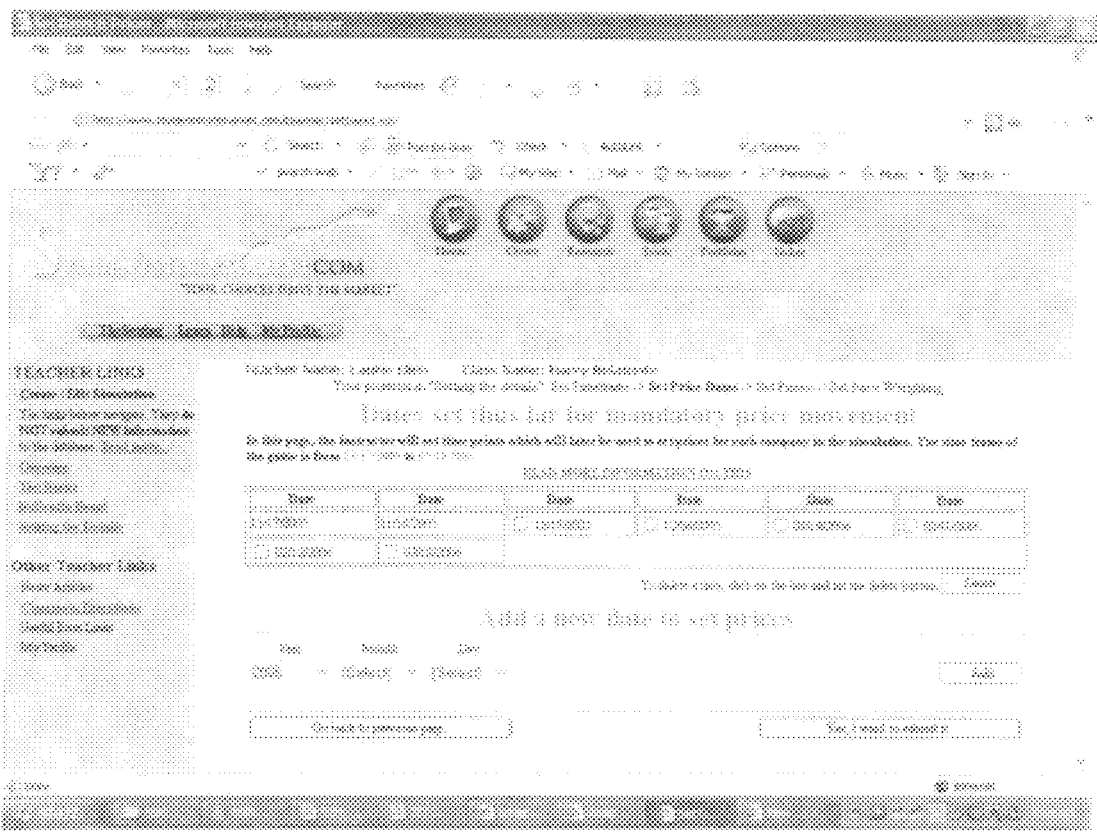
FIG. 10 is a screen shot of an optional step where the Instructor sets the base prices for each company.

Referring next to FIG. 10, a screen shot of an optional step where the Instructor sets the base prices for each company is shown. Initially, the instructor should decide how many dates the prices will be set. Said selection will occur by selecting a date and selecting the "add" icon.

Figure 11:
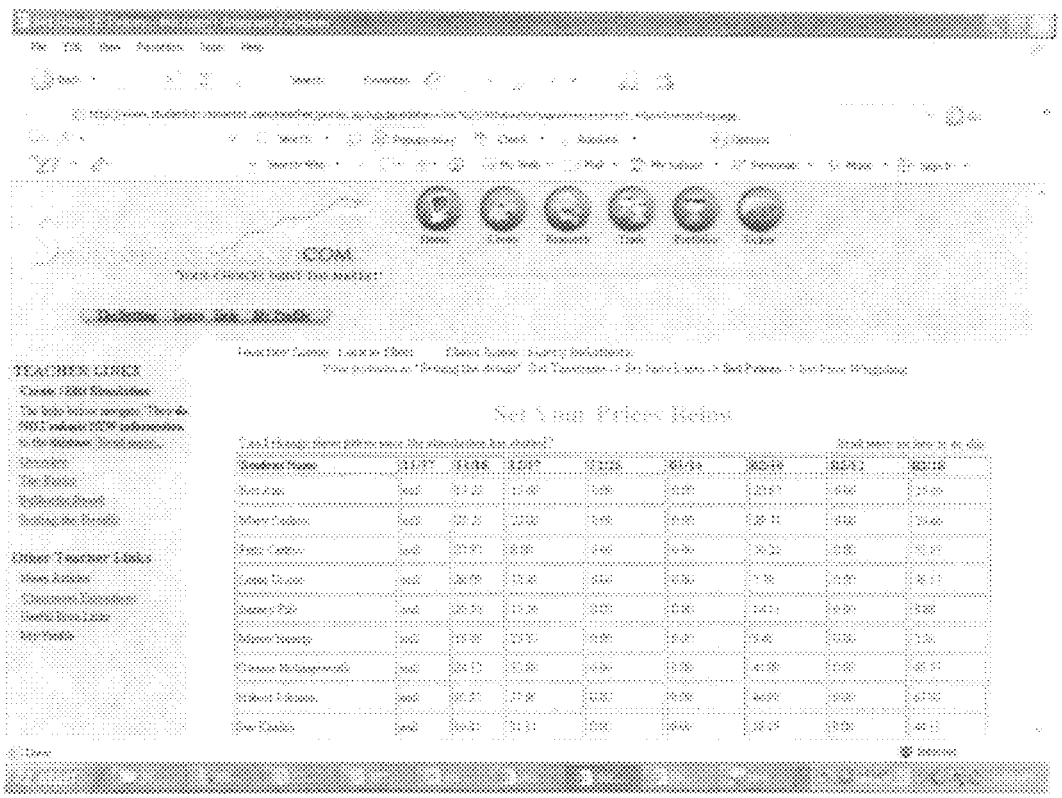
FIG. 11 is a screen shot of an optional step where the Instructor sets the base prices for each company.

Referring now to FIG. 11, a screen shot of an optional step where the Instructor sets the base prices for each company is disclosed. Said prices appear in this FIG. Price setting in this manner is a simple and easy process. Said process is accomplished by entering the price for each date in the provided table. It is ensured that prices are set fairly by the reading of tips and suggestions of this process by the instructors.

Figure 12:
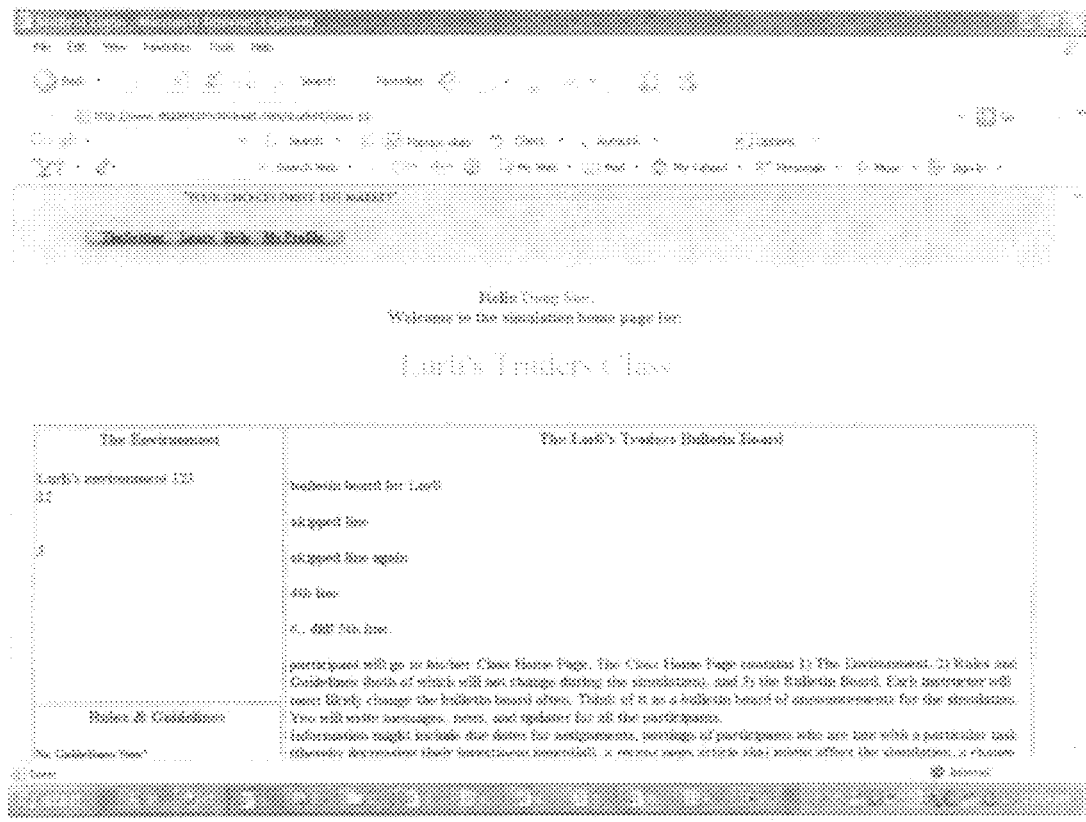
FIG. 12 is a screen shot of where participants buy/sell shares, make deposits, and take out loans as they monitor share prices while staying abreast of current news and the management individual portfolios.

Referring next to FIG. 12, a screen shot of where participants buy/sell shares, make deposits, and take out loans as they monitor share prices while staying abreast of current news and the management individual portfolios is shown. Once logged in, all participants are greeted by the Class Homepage.

Figure 13:
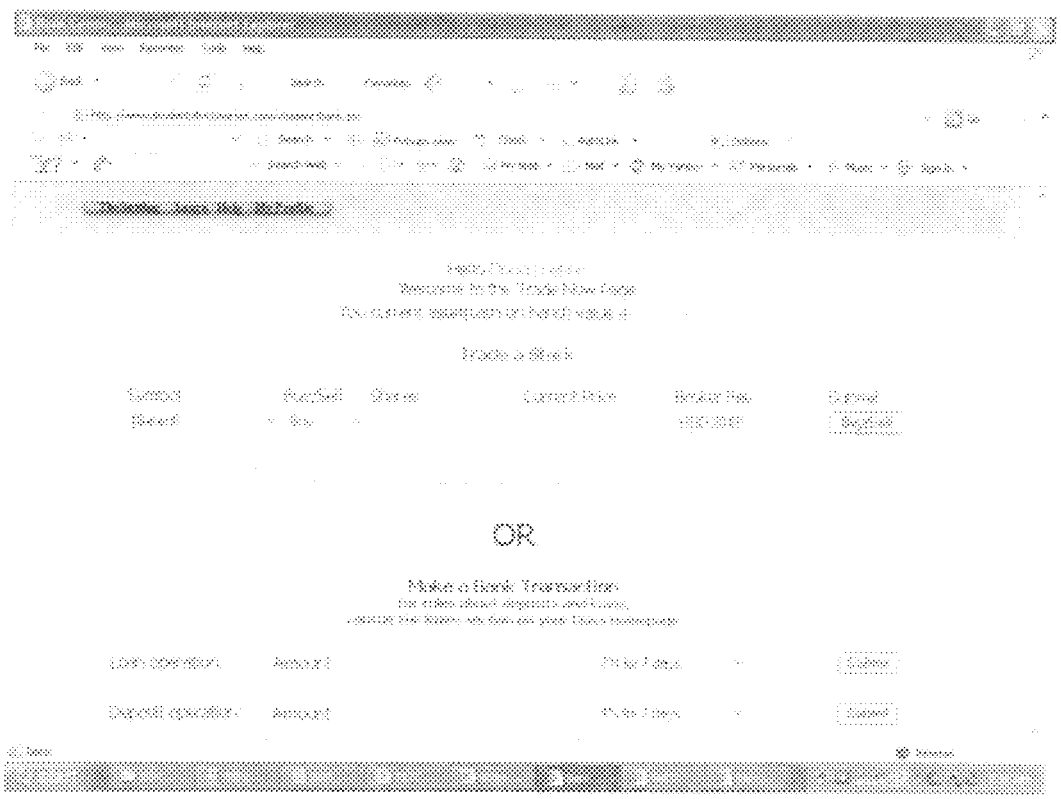
FIG. 13 is a screen shot of where participants buy/sell shares, make deposits, and take out loans as they monitor share prices while staying abreast of current news and managing individual portfolios.

Referring now to FIG. 13, a screen shot of where participants can monitor their current assets. Total cash on hand is provided on the top of said screen. The participant has the option of buying or setting shares. Additionally, participants can, make deposits, and take out loans as they monitor share prices while staying abreast of current news and managing their individual portfolios is depicted. Trading and banking are done through the "Trade Now" page When loans or deposits are transacted, the user has the option of selecting the interest as well as the duration.

Figure 14:
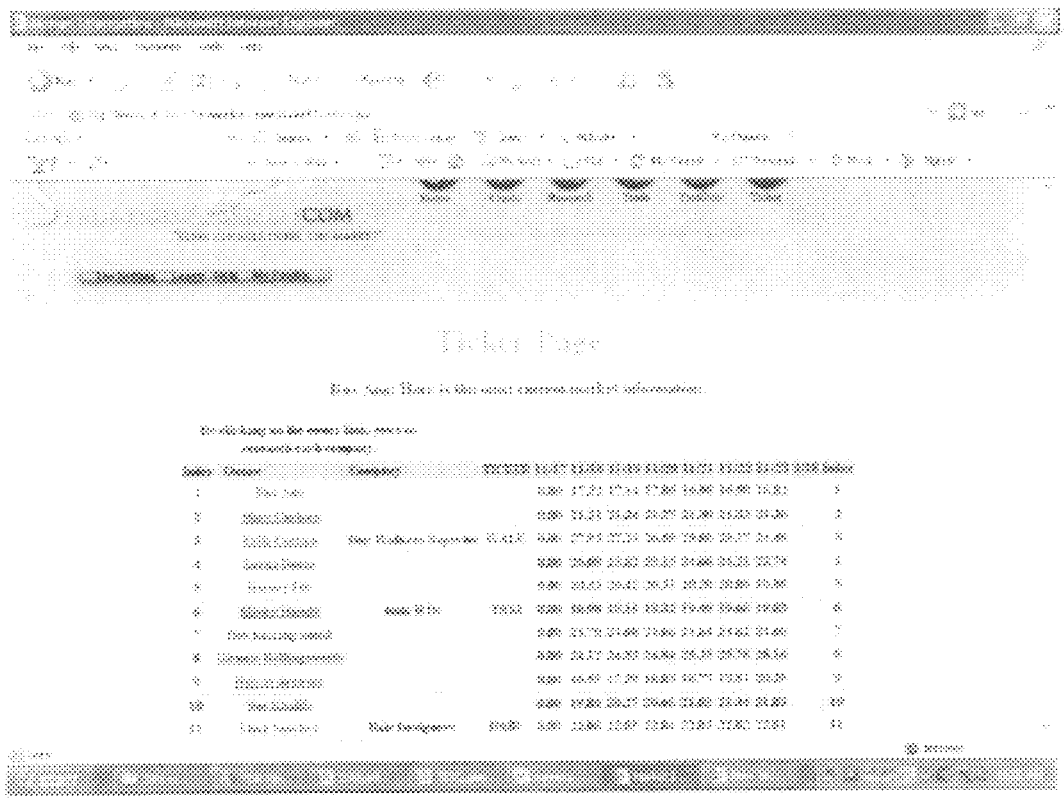
FIG. 14 is a screen shot of where participants buy/sell shares, make deposits, and take out loans as they monitor share prices while staying abreast of current news and managing individual portfolios.

Referring next to FIG. 14, a screen shot of where participants can monitor current prices of various companies available to buy or sell. Market information that is provided is the most current that can be provided by the system. Additionally, the user can view past performance to serve as an indication of market trends as well as possible future prices. Said screen is similar to a ticker board on conventional stock markets.

Figure 15:
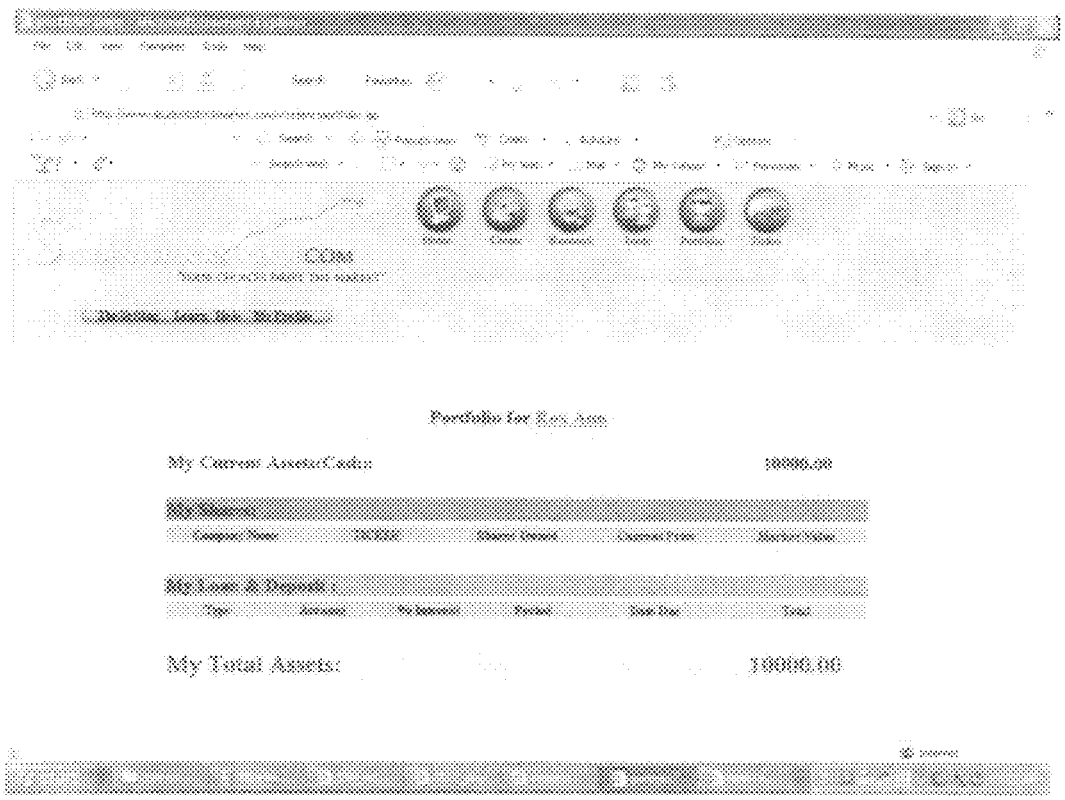
FIG. 15 is a screen shot of where participants buy/sell shares, make deposits, and take out loans as they monitor share prices while staying abreast of current news, and the managing individual portfolios.
Figure 16:
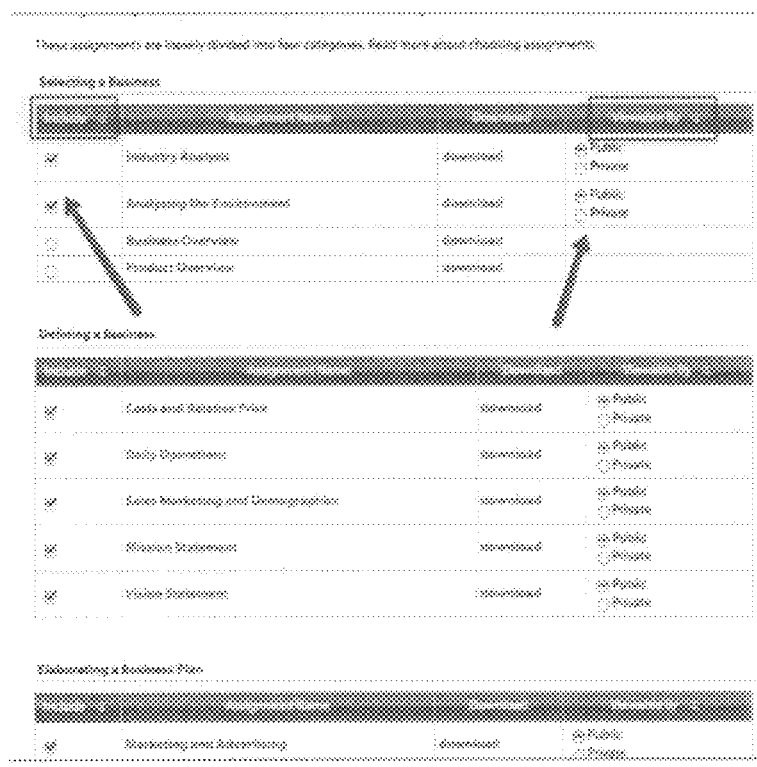
FIG. 16 is a screen shot of teacher page to determine which assignments to select.
Figure 17:
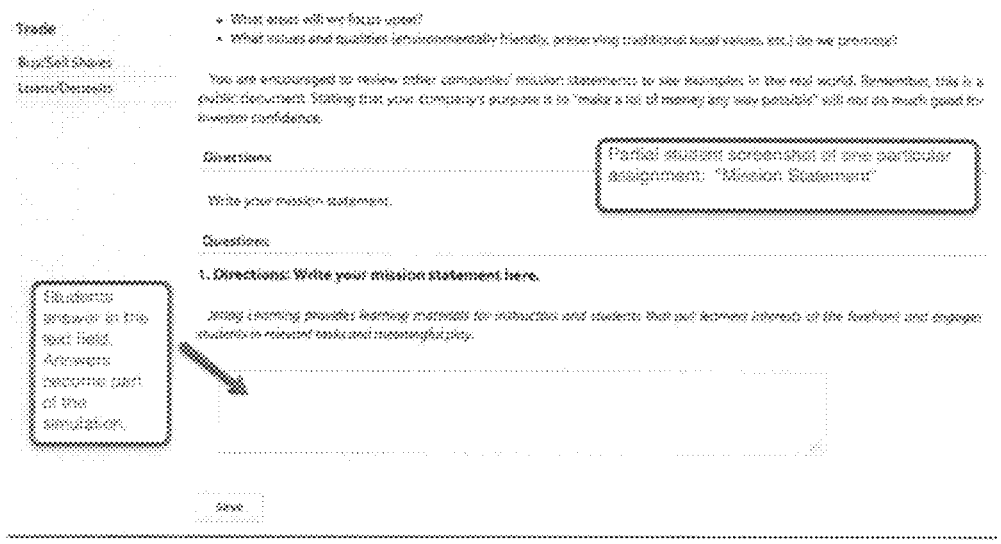
FIG. 17 is a student screenshot of one particular exemplary assignment "Mission Statement"
Figure 18:
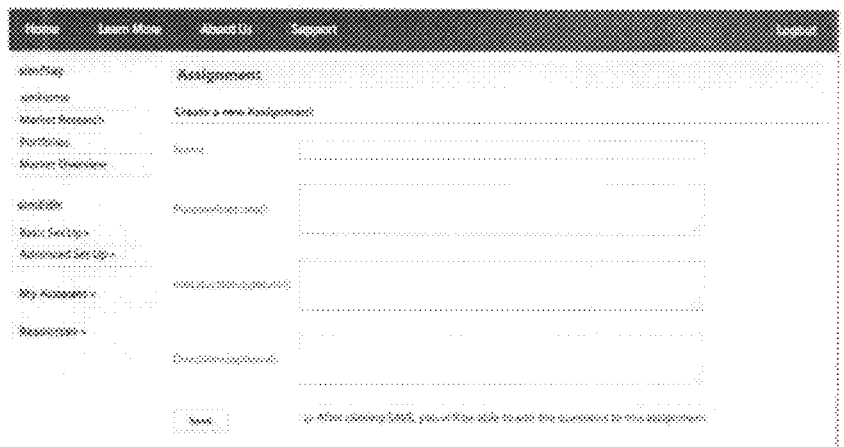
FIG. 18 is a teacher screenshot showing the creation of a Customized Assignment showing Step 1—Creating the name of the assignment.
Figure 19:
FIG. 19 is a teacher screenshot showing the creation of a Customized Assignment showing Step 2—Creating the questions within the assignment.

Referring finally to FIG. 15, a screen shot of where participants can view their current portfolio. Information provided includes current cash assets, current shares invested in various companies as well as current price and net worth. Additionally, information of funds involved in currents loans and deposits are also displayed. Said screen functions as a score board by allowing participants track their asset value with the said portfolio page. Teachers and students can utilize dynamic graphic features to chart portfolio growth, transaction history, stock prices, and other types of data present in the simulation 2. Operation of the Preferred Embodiment The operation of the present invention, as shown in conjunction with FIG. 16 through 48, in which teacher users, inputting on a computer through web-based computer inputs, essential criteria of a business plan for students to complete. Operationally, this is done in the following manner which requires regular skill in the art of programming. The essential criteria of a business plan are shared with the student-user in one of two ways by the teacher-user:

1. The teacher-user selects which pre-created criteria (ie. assignments) are chosen for all students to answer. This is done by the teacher-user through the screenshot below. Areas to note are:
   a. The "Include" column. If 'checked', an assignment is visible to all student-users to answer.
   b. the "Viewable By" column. Each teacher chooses to make each assignment ether:
      i. public—student answers are visible to all student-users and the teacher
      ii. private—student answers are visible only to that student and the teacher (See FIG. 16)
2. The teacher creates a customized assignment, defining the customized criteria and questions which the teacher-user desires the student-users to answer in defining their business plans. This is done through the screenshots shown in FIG. 17.

Important elements to consider are:
   a) The teacher-user can create as many questions within one customized assignment as he/she desires.
   b) The teacher-user can create as many customized assignments within one simulation as he/she desires.
   c) Upon completion by the teacher-user, the assignment is viewable and able to be answered by the student-users.

Operationally, industry categories are chosen by the student-users from a pre-populated list of industries already entered into the simulation. Student users make this selection as they create their business. See the screenshot for a user's perspective on how to select an industry.

Figure 20:
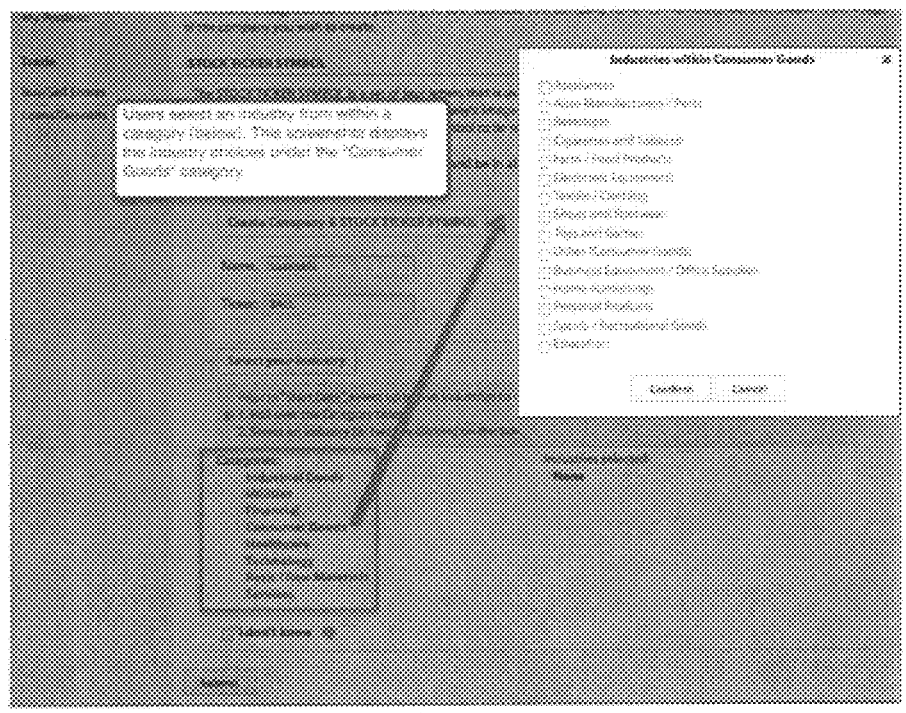
FIG. 20 is a Student screenshot depicting how a student selects an industry.
Figure 22:
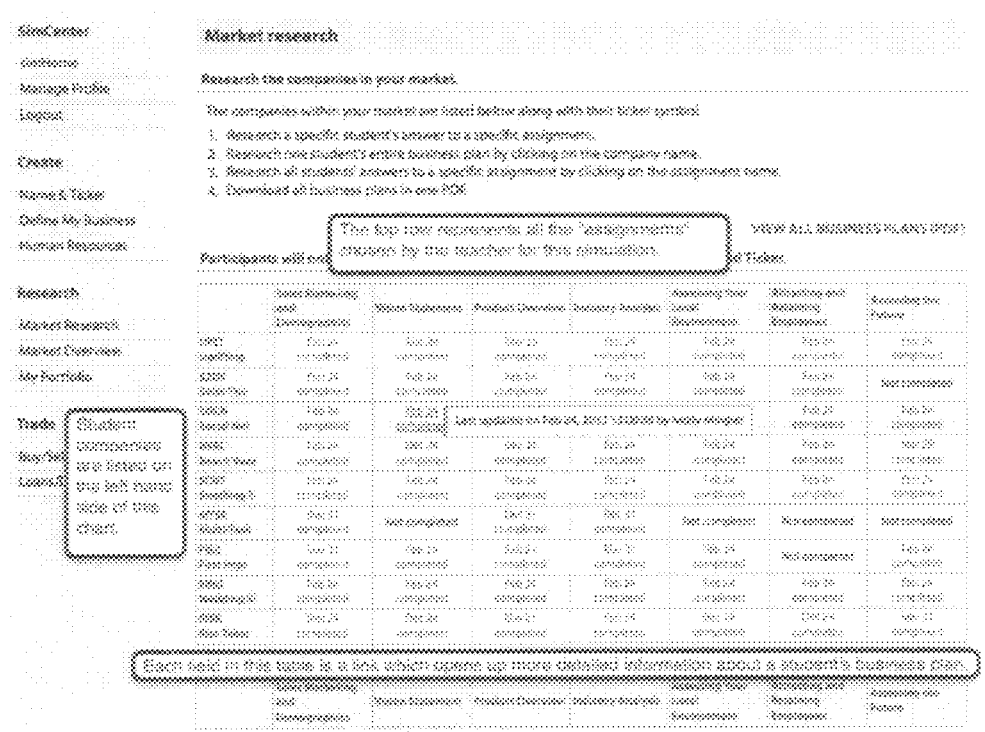
FIG. 22 is a screenshot of the Market Research page, showing all companies and assignments.

As shown in FIG. 20, a student's industry selection is associated with the company within the database. The industry selection is connected to some future price adjustments associated with specific, dynamic news articles which are pre-programmed to affect specific industries.

Students further define their business plan through answers to the business plan questions within the assignments (either pre-created assignments chosen by the teacher or customized assignments created by the teacher).

Figure 21:
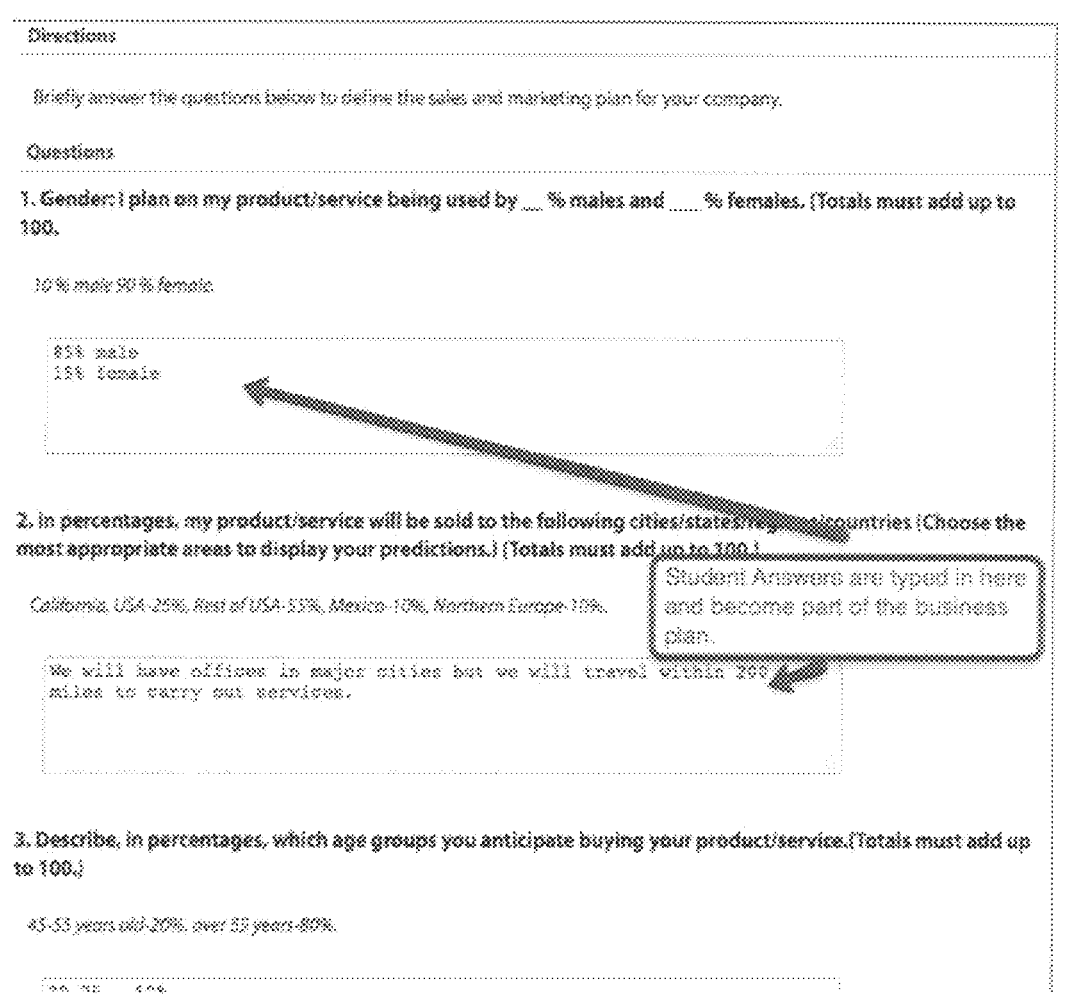

As shown in FIG. 21, students can modify answers before and during the simulation, thus altering their business plan. Customized assignments created by the teacher can force all students to address specific issues of importance (carbon neutral operations, outsourcing overseas, the role of unions, etc.) as a simple display of data from the database of student and company information. It can be seen in the screenshot in FIG. 22. This research page can be accessed by the student and the teacher.

Figure 23:
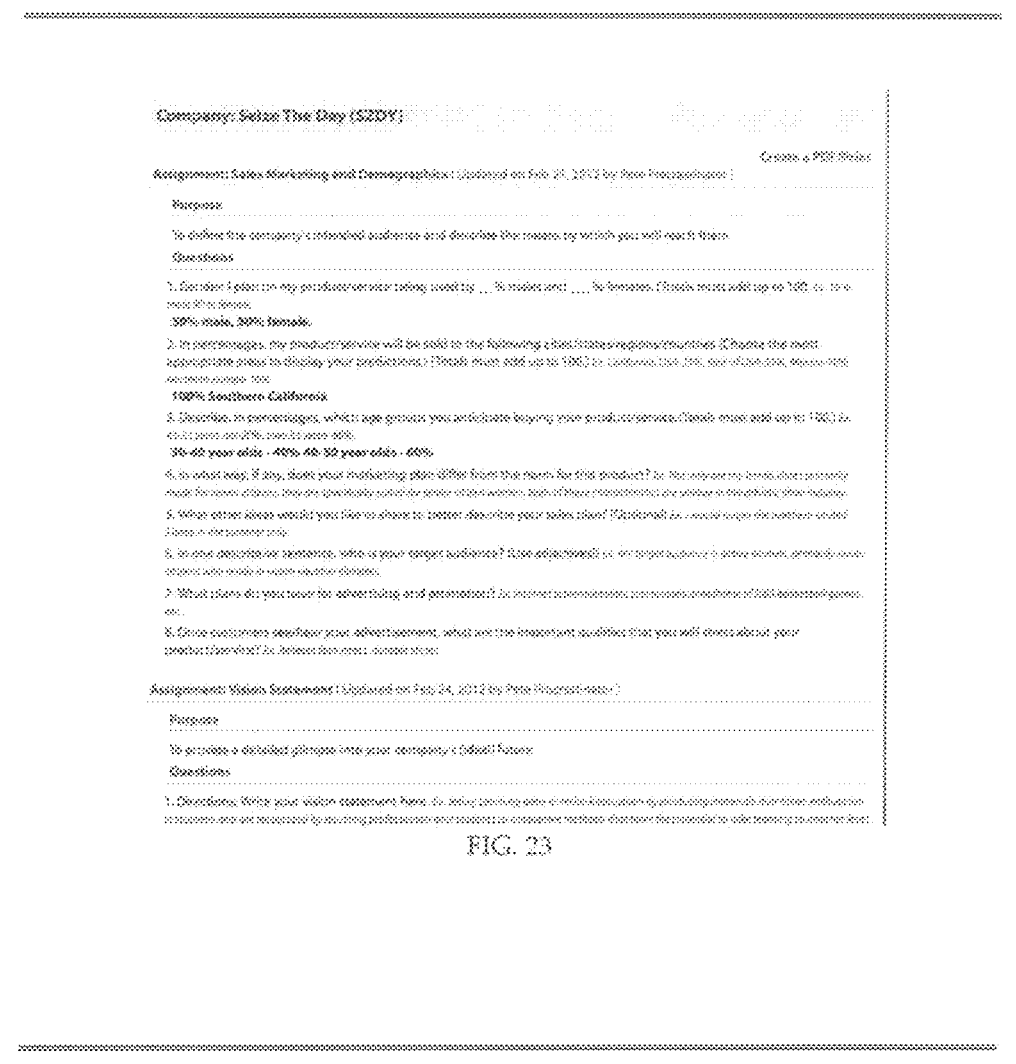
Figure 24:
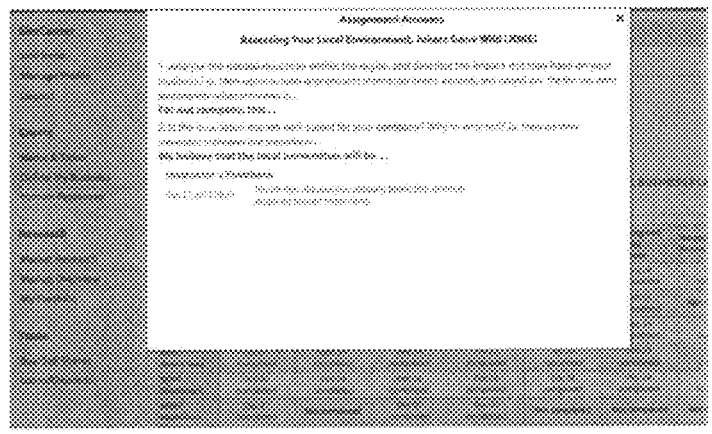
FIG. 24 is a screenshot of one student's answer to one assignment.
Figure 26:
FIG. 26 is a screenshot of a teacher inputting a new bulletin board message for display to simulation participants.
Figures 27, 28:
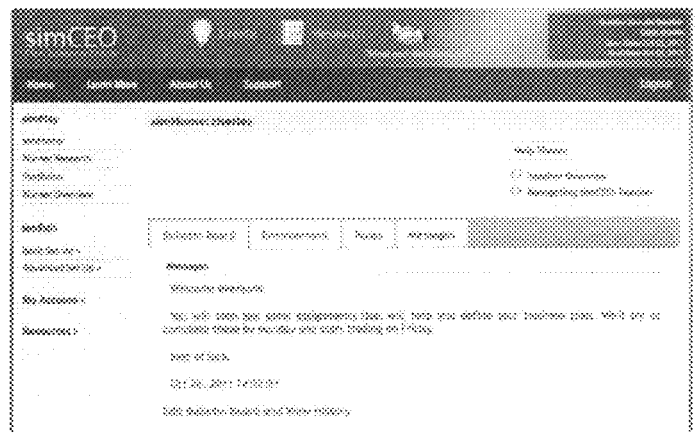
FIG. 27 is a display of bulletin board message on Student or Teacher simHome page.
FIG. 28 is a screenshot of teacher options in potentially using previously created news articles.

Clicking on the name of the business (left hand column) opens up that company's entire business plan, as shown in FIG. 23. Clicking on a company's individual answer to a specific assignment opens up that assignment answer, as shown in FIG. 24. Note the "feedback" shared by the instructor represents another feature of the simulation. Instructor feedback to assignments. Instructor feedback is only visible to the student who is the CEO of that company; instructor feedback is not visible to all students.

Clicking on the column heading (assignment name) opens up all the Students' answers to that assignment as shown in FIG. 25.

Teachers can choose a said price weighting for the price-changing effect of individual student trades. Example: volatile, moderate, or safe. Price changing mechanisms may be incorporated by adding dynamic news into the simulation which can automatically influence company share prices and also force encourage student-users to adjust their business plan and portfolio. Operationally, this is accomplished in either of two processes. Both processes encourage student-users to make adjustments in order to be successful in the simulation. As a CEO, news articles encourage student users to reflect upon and possibly adjust their business plan—to find new suppliers, target new users, etc.—based on the news article. As investors, some news articles have a direct impact on some/all companies. Student investors must reflect upon and possibly adjust their portfolio of investments to stay ahead of the market and maximize their returns based on the current news. Teachers can share news articles in one of two ways.

1. Teachers are able to manually enter real or fictional news articles through the "Bulletin Board". This process shares news and encourages student-users to take action. It does not automatically change share prices.
   a. Teachers create/edit the "EditBulletinBoard" (See FIG. 26).
   Clicking submit displays the message on the main Bulletin Board page. (See FIG. 27)
2. Teachers can manually select previously created news articles for inclusion into the Bulletin Board. The teacher can also control an automated, random function for inclusion of these previously created articles. Each previously created article was created by the administrator of the simulation (not the teacher), and each article is assigned a "Price Variation" (column 2 of screenshot), expressed in percentage terms. Each article is associated with (column 3 of screenshot) either:
   a. one (random) company, selected by the computer.
   b. one or more specific industries, (reminder: Each company is linked with a specific industry of the student-user's choosing.)
   c. all companies.

Price adjustments take effect at a future random point in time (ex. 48 hours after the article appears). Teachers can click the "Use Now" button to immediately display the article. Teachers can also make this process automatic by completing the choices at the top of the screenshot to make this feature "Active" (as in FIG. 28) and inputting the number of articles to be displayed and the frequency with which those articles should appear on the Bulletin Board.

Whether selected with the "Use Now" button or whether the article is randomly chosen from the automatic function, the article(s) appears in the bulletin board below. (For details on how the share price is adjusted automatically, refer to the later section on Share Price Computation Processes.)

Figure 29:
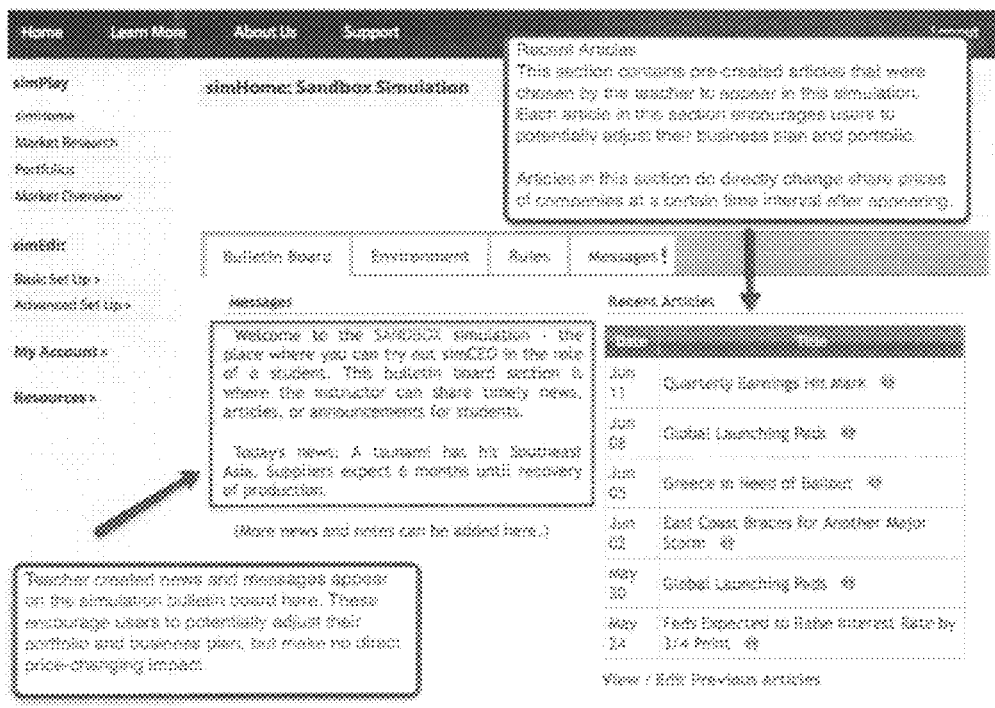
FIG. 29 is a screenshot of competed Bulletin Board, showing both types of articles.

AS shown in FIG. 29, either teams or individuals to compete in the simulation. Operationally, this is dons in the following manner which require regular skill in the art of programming. Teams can be chosen by the instructor or students, and each team is treated as an individual. (ie. one username and password). However, within the programming of the simulation, teams are able to be formed between a) a CEO and b) non-CEO(s).

When users are entered into the simulation, it is done by the instructor in a two step process:
1. Student names are entered.
2. The student-user is marked as a CEO (ie. a checkmark FIG. 30) or a non-CEO (no checkmark. CEO student-users are "business and trade" individuals. Non-CEO student-users are "trade only" individuals.

Figure 31:
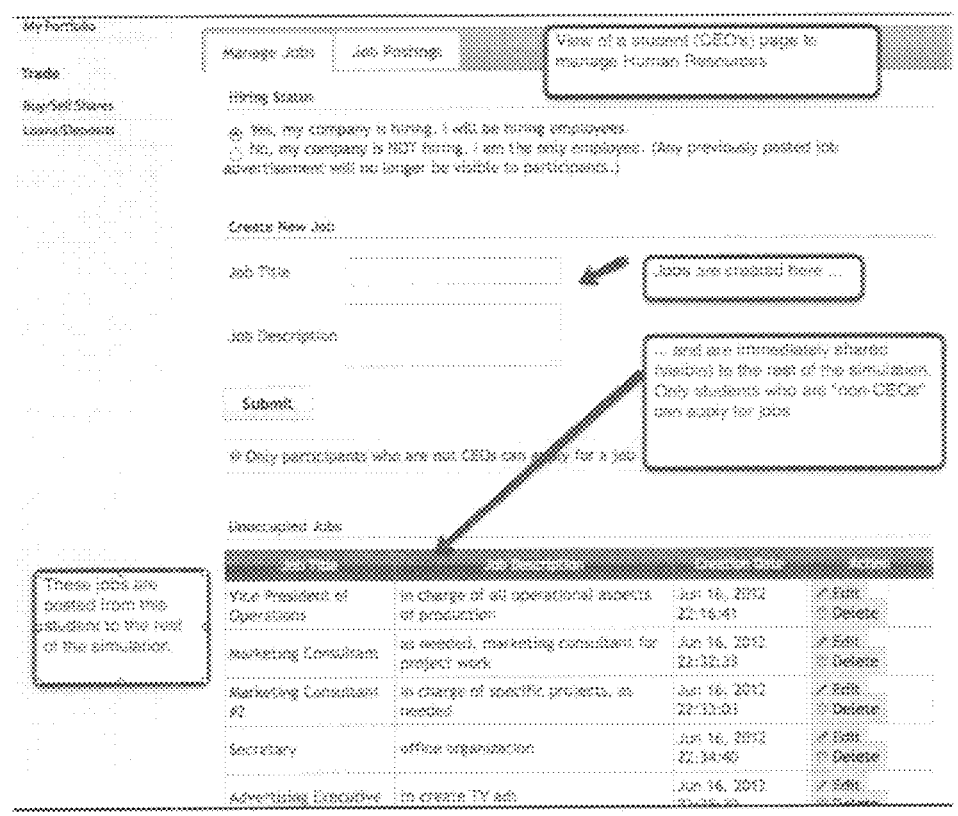
FIG. 31 is a screenshot of a student CEO's Human Resource page (top portion)
Figure 44:
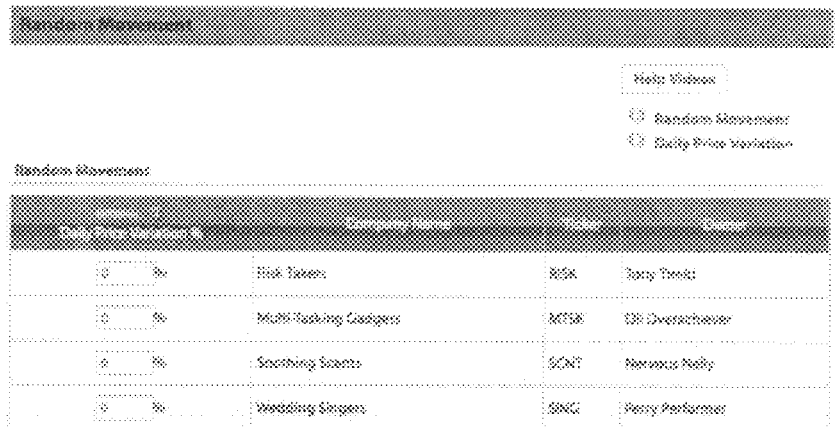
FIG. 44 is a partial teacher screenshot of Random Movement option.

Operationally, the programming for the creation of teams uses the above-referenced teams (CEO and non-CEO). The programming is set up to:

1. Allow teachers, when entering student participants, to designate each student as either:
   a. a CEO—a student-user who will create/edit a company) or
   b. a "non-CEO"—student-user who will not create a company, but can trade a portfolio and apply for jobs posted by other CEOs
2. Ensure that a non-CEO student-user is not able to edit any business plan; the non-CEO must be hired by one of the CEOs in order to create/edit a business plan.
   a. A non-CEO can only be hired by one CEO at one time. (The non-CEO can only be associated with one company at a time.)
   b. The CEO can hire multiple non-CEOs
   c. Once hired, the non-CEO has full access (edit, delete, etc.) to the business plan.
3. Provide a Human Resources page where:
   a. CEOs create and share a job advertisement to which the non-CEOs may apply
   b. CEOs can view non-CEO "Current Applicants" and click a button to hire a non-CEOs for each job opening.
   c. CEOs fire non-CEOs who have already been hired by the CEO.
   d. Non-CEOs can go to look for Job Postings, to which the non-CEO can apply as shown in FIG. 31.

Figure 32:
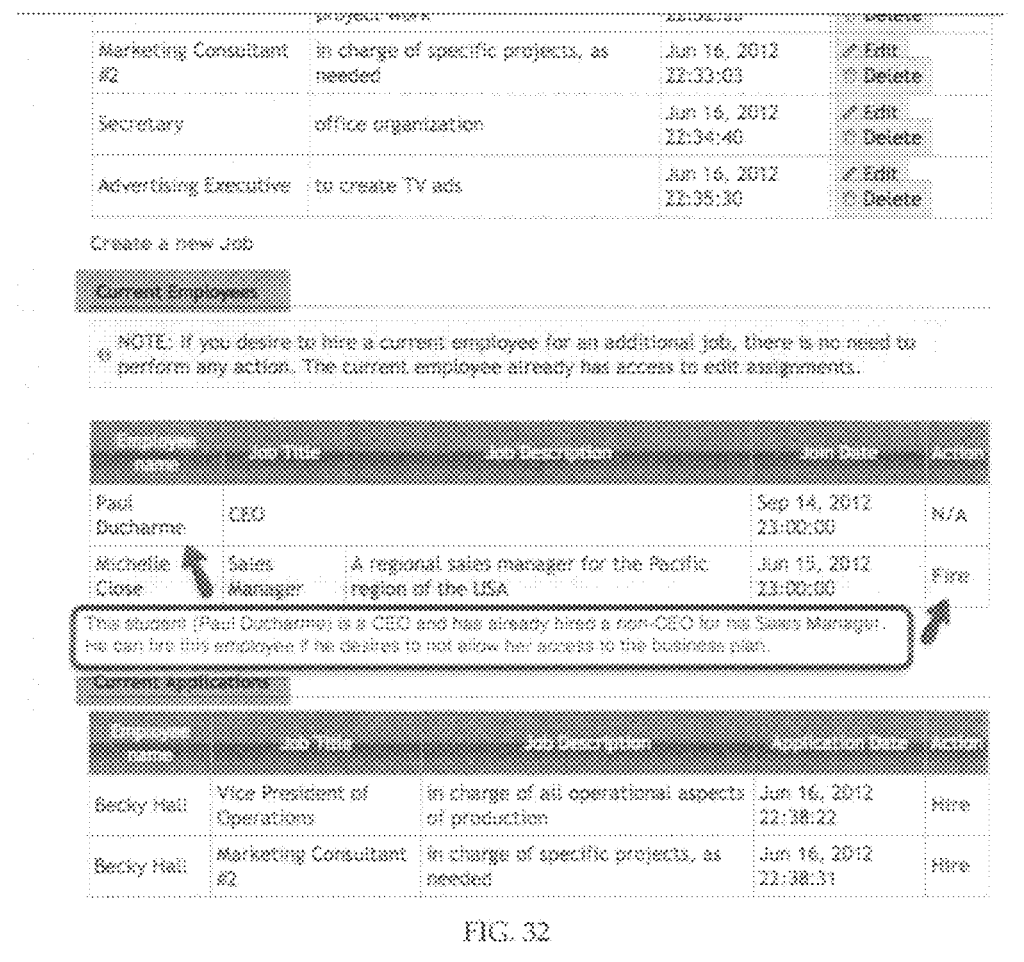

As shown in FIG. 32, a CEO's Human Resorces Page is provided which includes:

CURRENT EMPLOYEES: The CEO (Paul Ducharme) has hired a Sales Manager already, allowing Michelle to edit Paul's Business Plan; and CURRENT APPLICATIONS: The CEO (Paul Ducharme) also is reviewing applications from another applicant (Becky Hall) for two additional job postings. He can hire her by clicking the button, allowing both non-CEOs (Becky and Michelle) to edit his business plan.

From a programming standpoint, each company can only be associated with one CEO. Once hired by the CEO, the company can be associated with an unlimited number of non-CEO. However, a non-CEO may only be associated with one company at a time.

The selection of the Start and End Trading Date determines the rate-of-return for other simulation price functions such as loans, deposits, and share price daily changes.

The Start Date and End Date cannot exceed one calendar year. The simulation is pre-programmed to simulate rates of returns based on ten fictional years. These rates of returns are determined by the Start and End Trading Date. It is accomplished in the following steps.

1. The programming first determines the number of actual "Days" in the simulation by computing the difference between the Start Date and the End Date. Example, in conjunction with FIG. 34:
   a. Start Date: February 1
   b. End Date: February 20
   c. The "Days" for this simulation equals 20 days.
   d. Each real "day" in the simulation represents 6 months of fictional activity. (20 days real time=10 years fictional time)

As shown in FIG. 35, students may take out loans or initiate deposits through the Bank Now page. Student users can choose between "loan" or "deposit". Student users can choose the duration of the loan from pre-set choices. (Such as, for example, "3 days loan—4.0% Annual Percentage Rate"). Student users confirm their choice after view reviewing the details of the transaction.

The programming of this function is dependent upon the "Days" calculation reference above. Once the "Days" calculation has been determined for the simulation, all rates of returns for loans and deposits are adjusted according to the equation below. The "Days" calculation is divided by a ten year timeframe. Example: A simulation with 20 "Days" will have each day represent 6 months of fictional time.

A yearly rate of return is adjusted according to the period of time allotted to the Days calculation. Example: Given the calculation in the example above where one day=six months of fictional time, a 4% loan that is taken out for 2 days would mature at $104.

One possible method to calculate the equation of a RATE OF RETURN FOR ONE DAY in the simulation time is:
  (i) 365 (days in a real year) multiplied by 10 (years of the fictional duration)=3650;
  (ii) 3650 divided by 20 (actual "Days" as stored in the simulation from the calculation of the Start and End Dates)=182.5, which can be called the loan/deposit variable.

The interest rate selected by the user (4.0% in this example, expressed as 0.04) multiplied by the number of days specified by the student-user for the loan/deposit multiplied by the number of days specified by the student-user for the loan/deposit, multiplied by the loan/deposit variable (182.5 in this example) divided by 365 to equal a Final Loan/Deposit Rate of Return
  (iii) $0.04 \times 2 \times 182.5/365$=Final Loan/Deposit Rate of Return
     1+Final Loan/Deposit Rate of Return multiplied by the principal amount.

In this example, a 2 day loan for $2,000 at 4% interest in a simulation with 20 "Days" in it would yield $2,080.

Students can input data relative to quarterly earnings, earnings per share, revenue projections and other business aspects into the simulation through any customized assignment that was created by the teacher and subsequently answered by the student. These answers do not directly influence share prices. These answers, like other student-answers which define the business plan, have the potential to influence other student users as they buy/sell shares bated on the student responses.

The teacher-user can also adjust prices according to the student answers to these questions. When completed correctly and in enough detail, students can compare their earnings, revenues, company's overall value, and other business indicators through legitimate comparisons to similar, real businesses within their industry, as shared by the teacher or student, and verified by the rest of the simulated market.

Correct and realistic forecasting in relation to similar real-world companies, and proactive responses shared through the business plan to the real issues confronting these real-world companies will be rewarded by student users (through buying shares) and teacher users through raised share price predictions, potentially resulting in an increase in share price.

In the example chart of FIG. 37, each row represents a sample student transaction and the resulting "New Price" expressed in one of the three ways.
  (a) safe, with a variable of "7"
  (b) moderate, with a variable of "5"
  (c) volatile, with a variable of "3"
During the set-up phase of the simulation, teachers are able to choose one of these three choices and the associated variable (7, 5, or 3) is placed within the price-changing equation for that simulation to determine the weight (effect) of student shares, bought/sold.

Other variables can be added by the administrator to make the price-changing formula either more volatile or safer than the 3 choices presented above.

The $3^{rd}$ column represents shares (bought or sold). Bought shares are expressed as a positive number. Sold shares are expressed as a negative number.

To use an example of a transaction represented in the top row, using a 'volatile' calculation.

The old share price is 20.00, and the student wants to purchase 25 shares of the company for a total dollar amount of 500.
  1. New Price=20+20*25/3/(20+25)
     a. 20+166/45
     b. 20+3.70=23.70
  2. This new price is calculated immediately and is displayed for all users on the Market Information page as well as all individual portfolios for students who own the company.

It is important to note that price is automated, with the changing mechanisms not controlled by the teacher or student. If the price of a company would not change over course of 24 hours, this would decrease the realism of the simulation. Therefore, at the end of each day, after the 'end of day' price has been stored in the database, every company in the simulation is placed through the random equation below.

| RM Equation: | New Price = Old Price + (Old Price * Rand Number between −1 and +1) | |
| --- | --- | --- |
| $23.12 Old (end of day) Price | −0.016 Random variable between −1 and 1 | $22.75 New Price |

There is also a teacher controlled price changing method. There are two types of methods that teachers can influence the prices of companies.
  1. price changing options that occur at regular intervals. (Ex. every day at 1:00 am)
  2. price changing options that occur at various points, or on demand. Teacher—Controlled Price Changing Options, occuring at pre-determined, regular intervals There are three different options from which teachers can choose determining the method and degree of price-manipulation which can occur within a simulation. This choice can be changed at any time before or during the simulation. The results of this choice will take effect at pre-programmed, regularly scheduled intervals. (Ex. 1:00 am each day). The three options are: Random Movement; Star Ratings; and Enter Prices. A teacher chooses by ticking the button below. Only one option can be functioning at one time. Students are unaware of which option has been chosen.

There are multiple functions operating which have the potential to change prices. Some of these automated features occur at the end of each simulation's day, or other pre-programmed times. Some dynamically alter prices immediately. Some are controlled by students and some by the teacher. All company prices are stored in a database at the end of each day, at a specific time. (Ex. midnight) These provide the means for day-to-day and historical growth/loss comparisons of each company.

Each transaction made throughout the simulation is recorded in the simulation's database, but each of the multiple price fluctuations that may occur within a single day are not each recorded for each company. Only the 'end-of-day' price is recorded.

Students dynamically change share prices through buying or selling shares of companies. Each student's portfolio is immediately adjusted to reflect the additional/decreased shares owned as well as the new share price. The share price is altered according to the following practices. These are not meant to be an exhaustive lists as other equations and means to adjust share prices exist as well.

One basic formula for computing price changes based on student buying/selling shares is:

New Price=Old Price+Old Price*Shares/variable/(old price+absolute value of share)

Each of the three options is explained in conjunction with FIG. 38.

Teacher Option 1: Enter Prices

This option provides the teacher with most direct control over the company share prices. To exercise this option, the teacher:

1. Enters a future date between the Start Date and the End Date. The date will appear on the chart below.
2. The teacher can then fill in the Destination Price for each company on that given date.
3. Teachers can enter as many dates as preferred.
4. Future prices and dates can be modified.
5. Within this choice, the simulation is programmed to change prices according to the following programming logic.
    a. The simulation's records the 'End of Day' price for a company.
    b. The programming looks toward the next date that was entered by the teacher, and computes the days between the current date and the teacher's entered date.
        i. An example is from the screenshot of FIG. 39. If today's date was March 4 the next date on the chart from the screenshot at FIG. 39 would be March 9, representing 5 days.
    C. The programming records the current share price of the company (for example, $48.51 for a company such as UPLT) on March 4 and finds the difference between this price and the Destination Price on the next day in the chart ($49.51 on March $9^{th}$, for this example). This turns out to be a $1.00 difference in this example.
    d. The programming divides the number of days to the Destination date (5) by the dollar difference between the current price and the destination price. (Ex. $1.00 divided by 5=0.20).
    e. After the 'end of day' price is recorded for this company, the programming logic will change this company's price by raising it 0.20.
    f. This process is repeated for each company each day.
    g. NOTE: Share prices changes occur during each day through multiple means, so the future adjustments to the share price will not necessarily be $0.20 for the upcoming days.
    h. NOTE: Students are unaware of the dates or prices that have been chosen by the teacher.

Teacher Option 2: Star Ratings

Star ratings allows to click on a graphical interface of 'stars' for each company. In this way, a teacher who wants a Company A to outperform Company B can choose more stars for Company A. The teacher can make star selections through the screen below. Clicking on the star immediately changes the star value for that company. Star values allows a teacher to assign a range of values for each company's daily price change. Teachers can change star values for individual companies as often as they prefer. Students are unaware of any of the specific star values for any company.

Figure 40:
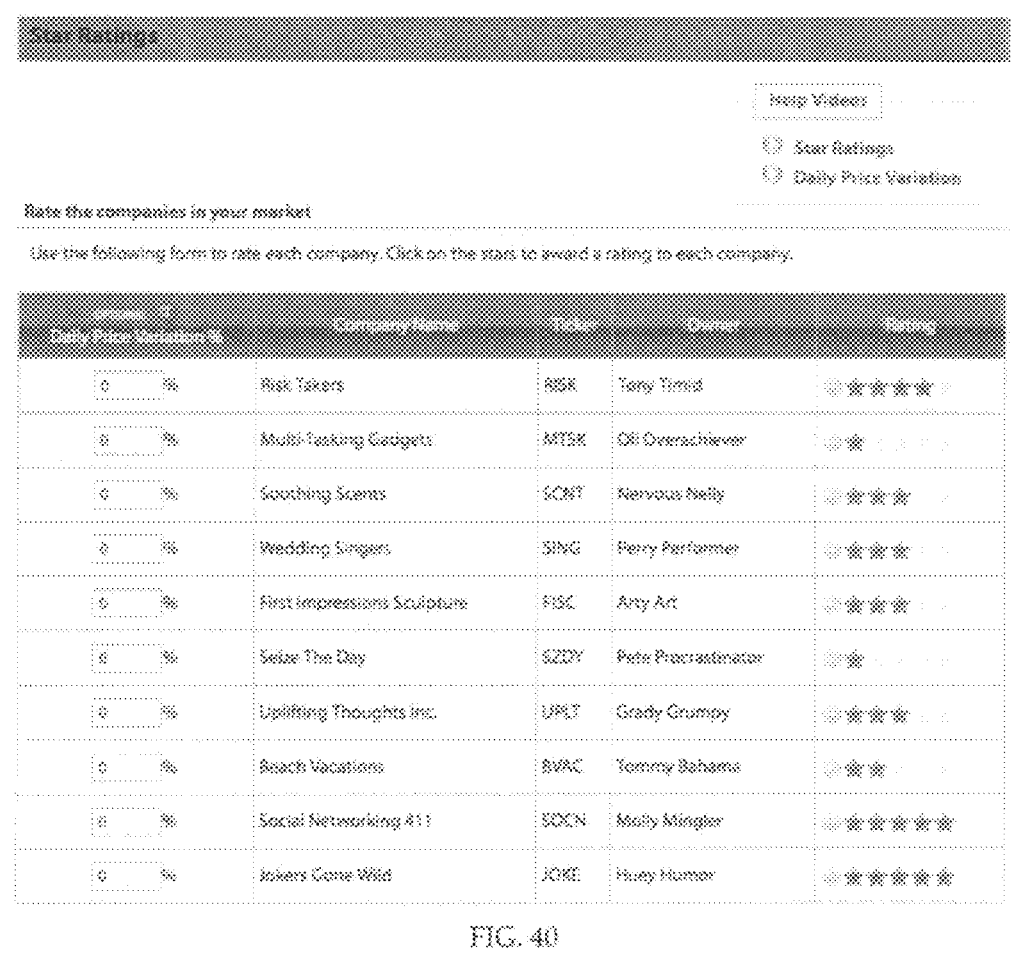

As shown in FIG. 40-41, The Star Value price-changing method utilizes the "Days" that were determined from the Start and End Dates, described earlier. The Star Value method operates in the following manner.

1. A simulation has a defined number of "Day". Each Day must is grouped into various ranges as described below (in image 122) in the column on the right. For example, a simulation in which there are between 17 and 24 "Days" would use the Star Value variables that are shaded in yellow.
2. Each range is defined by five different variables "Score/Star Value" to be used in the equation below.
3. At the end of each day, after the 'end-of-day' price is recorded for each company, the programming associates each company with its corresponding Star Value. The following equation is run which will dictate the price adjustment that will occur.

DESTINATION VARIABLE (DV)

New Price=Old Price+(Old Price*Random Number between variable #1 and variable #2*10)/100

For example, a company with a 23.00 dollar a Star Value of "2" in a simulation with 19 "Days" would have the variable 14 and −10. The equation to change the company's share price for one day might be:

New Price=23.00+(23.00×6)/1000

New Price=23.14

4. Each company runs this equation (based on the star value for that Company), at each pre-programmed interval (usually, one day), and the random number is unique for each company.
5. The creators of the simulation have populated the entire chart with pairs of variable ranges for each of the five star values for any "Day" value that is not greater than 365. (A simulation may not last more than 365 days.)

Teacher Option 3: Random Movement

Random movement represents the pricing option with the least amount of teacher influence. Students are unaware of this. Once chosen by the instructor, each company is treated in the same manner by the programming of the simulation.

Each company, at the pre-determined interval (ex. 1:00 am each day) is adjusted according to the same equation as the star value option. However, the difference is the set of variables chosen for Random Movement are much closer together, and therefore all companies in the simulation will have similar, but not exactly identical price changes each day.

DESTINATION VARIABLES (DV)

New Price=Old Price+(Old Price*Random Number between variable #1 and, variable #2*10)/1000

The equation is the same. However the variables for Random Movement are represented in the middle column of the chart on FIG. 41. For example, a simulation which has 19 "Days" and where the teacher has chosen Random Movement as the pricing option, will have a variable that is between 0 and 9.

The creators of the simulation have populated the entire chart with pairs of variables for every Random Movement "Day" value less than 365. (A simulation may not last more than 365 days.)

Teacher controlled price changing options may occur at various points, or on demand. Daily Price Adjustments can occur during the simulation, when teachers may wish to make one-time adjustments to specific company prices to reward/punish a company or simply to provide irregularity to the simulation. This feature is available to all teachers regardless of which of the three Pricing Options were chosen. This done through the process described below and shown in conjunction with FIG. 42-44. In each of the three options for price movement, the far left-hand column of each screenshot shows the column entitled "Daily Price Variation %". Through this process, the teacher can enter a percentage value (positive or negative) for as many companies as desired. This is useful to reward/punish students who have made an adjustment that merits a consequence in the short term.

The percentage that is entered by the teacher will be adjusted to the company's share price after the end-of-the-day price is recorded and after one of the three Price Changing Options has taken effect. For example, if a teacher had input the following in the page (FIG. 44):

10% Risk Takers

−5% Multi-Tasking Gadgets

The entered values would affect the share price, and then the values would return to zero for the next day, and the teacher would have the option to enter new values if desired.

Students are unaware of whether the Daily Price Variation has been used or the particular value that was/is entered.

Teachers can influence price through determining automatic articles that appear on the bulletin board and directly influence prices. This process is described above in screenshot in FIG. 28 and FIG. 29. In the process, the teacher can choose to have random articles appear on the Bulletin Board, with each article containing a pre-defined "Price Variation %" which is seen and known by the teacher but unknown to the students.

The teacher can also select specific articles to appear on the Bulletin Board, and these articles will appear immediately upon being selected. The Price-Variation Percentage will take effect on the stated company/industry/or all companies (depending on the article) after a pre-determined amount of time (Example: 24 hours). Students are unaware when this pride change will take place. This allows students time to see the article and have time to react to the contents of the article by adjusting their portfolio accordingly before the price change takes effect. The price change after (for example, 24 hours) represents the 'reaction' of the rest of the investing public, thus students need to react before the rest of the investing public.

When the pre-determined amount of time has elapsed, the price of the company(ies) is immediately adjusted.

Figure 45:
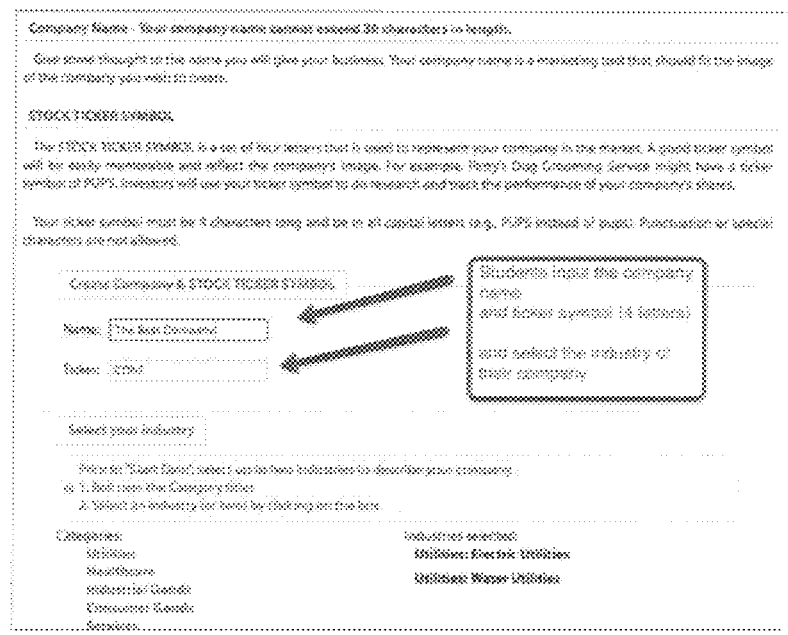
FIG. 45 is a screenshot of student page to create a company name and ticker symbol.

Creation of company name and company ticker symbol is done as shown in FIG. 45. Company names and 4-letter ticker symbols must be unique for other users in that simulation.

Figure 46:
FIG. 46 is a screenshot of Market Information, visible to students and Teacher.
Figures 47, 48:
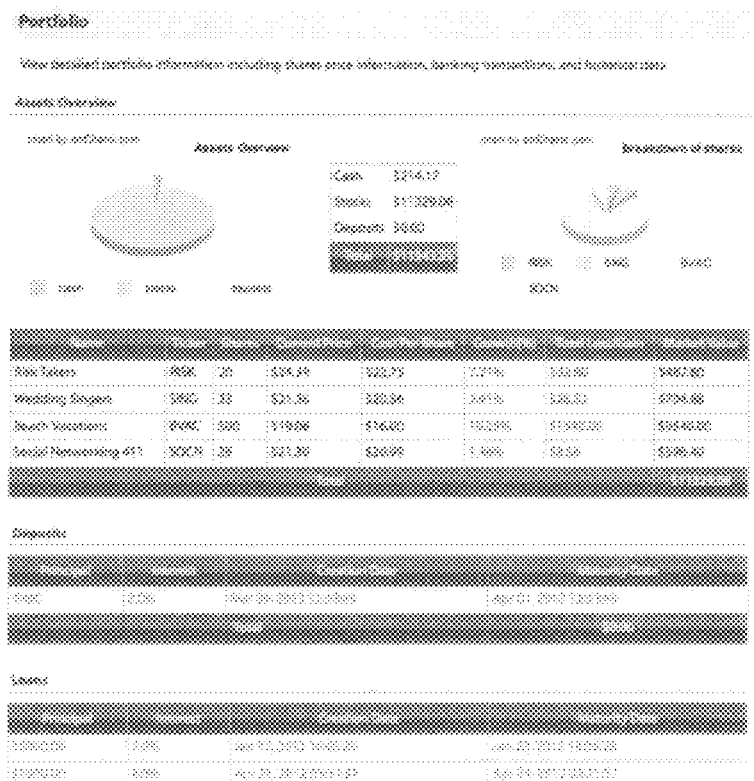
FIG. 47 is a student screenshot of portfolio page: values of cash, stocks, individual share prices, deposits, and loans (current and matured)
FIG. 48 is a Teacher screenshot of all the students' portfolio values and most recent transations.

As shown in FIG. 46-47, the teacher is able to view all the students' portfolio values as well as track the individual trades that have been made in chronological order throughout the simulation. FIG. 48 provides the data that the teacher receives. The programming of this requires regular skills to those trained in the art of programming.

Figure 49:
FIG. 49 is a screenshot of Student's Buy/Sell process.

FIG. 49 provides operational details as to how the process of buying/selling shares takes place. The programming of this requires regular skills to those trained in the art of programming. The students' steps, and programming requirements, for students to take out loans or make deposits is highlighted above in screenshot of FIG. 35.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A web-based, interactive and educational computerized simulation for combining a student-user's ability to create and operate a student-created business with a dynamic, interactive simulated stock market incorporating student-created businesses, said simulation utilizing a method comprising:

teacher users, inputting on a computer through web-based computer inputs, the essential criteria of a business plan for students to complete;

student-user's inputting on a computer through web-based computer inputs said criteria of said detailed business plan to define a fictional or a current, existing product or service and developed around said product or service, wherein once completed the business plan becomes immediately a part of the simulated stock market and represents a business or company in that market with said student-user becoming a CEO of a selected company;

student users managing an individual investment portfolio through buying or selling of ownership of shares in each other's said business; and adapting said business plan criteria by allowing a teacher-instructor to modify and customize said simulation exercise experience by:

(a) selecting of teams or individuals to compete in the simulation;

(b) [selection of said student-participants in said teams or as said individuals as either "business and trade" or "trade only" designations;

(c) creation of a bulletin board message used for frequent, whole-class information sharing;

(d) the creation of the simulation environment to match the time, place, and ability of the student-user thorough manipulation by the teacher-user through typing into web-based fields;

(e) adding dynamic news into the simulation which can automatically influence company share prices and also encourage student-users to adjust their business plan and portfolios;

(f) selecting or creating additional business plan components to be completed online by said student-users;

(g) selecting start and end dates for trading;

(h) selecting start prices of $20.00 or more;

(i) selecting a price weighting for individual student-trades and their effect on share price; and (1) outputting the adapted and modified business plan criteria to the computer.

2. The educational simulation method of claim 1, wherein said detailed business plan is adapted to include issues affecting a CEO.

3. The educational simulation method of claim 1, further comprising allowing teams of traders to join together to form companies.

4. The educational simulation method of claim 1, wherein:

a reward is provided to reward the best investor (the participant with the largest portfolio), and a reward is provided to reward the participant with the highest share price (the best entrepreneur).

5. The educational simulation method of claim 1, wherein said student-participants additionally are allowed to make choices regarding earnings per share, revenues, and expenses for each financial quarter simulated in said simulation exercise.

6. The educational simulation method of claim 1, further comprising:
   allowing said teacher-instructor to download said data specific to said simulation exercise in an individual portfolio to monitor said simulation exercise; and
   said student-participants are able to download said data specific to said simulation exercise in an individual portfolio to monitor said simulation exercise.

7. The educational simulation method of claim 1, wherein teachers can choose said price weighting as volatile, moderate or safe for the price-changing effect of individual student trades.

8. The educational simulation method of claim 1, wherein said student-participants are unaware of said additional prices set for said intended dates.

9. The educational simulation method of claim 1, wherein said teacher user can make changes to said prices previously entered at any time during said simulation exercise.

10. The educational simulation method of claim 1, wherein said adapted and modified business plan criteria output comprises simulation tool displays page options for said student-participants, comprising:
    (a) a view portfolio page;
    (b) a research page;
    (c) a create page;
    (d) a trade now page;
    (e) a bank now page to initiate loans or deposits;
    (f) a student class page; and,
    (g) a return to class page.

11. The educational simulation method of claim 10, wherein said student-participants can access said simulation pages at any time on the Internet™ to conduct research.

12. The educational simulation method of claim 10, wherein outputted information displayed on said portfolio page comprises:
    (a) current assets;
    (b) the fictional companies owned;
    (c) the number of shares owned or invested in various companies;
    (d) the current pricing of said shares;
    (e) the value of all of said shares owned;
    (d) loans due or said loans to be repaid;
    (d) deposits due to mature; and,
    (e) detailing of total assets.

13. The educational simulation method of claim 10, wherein outputted information displayed on said research page comprises:
    (a) the business plans of all of said student-participants;
    (b) the individual assignments for each of said student-participants; and,
    (c) a collection of said student-participant's answers to said assignments.

14. The stock market simulation tool of claim 13, wherein said business plans can be viewed online via a database linked to said research page.

15. The stock market simulation tool of claim 10, wherein outputted information displayed on said create page comprises:
    (a) creation of a company name;
    (b) creation of the company's ticker symbol;
    (c) selection of a company's industry;
    (d) assignments to be completed;
    (e) completed assignments;
    (f) edits to answers on current or past assignments; and,
    (g) alterations to said business plans.

16. The educational simulation method of claim 15, wherein said loans and said Certificate of Deposits are taken out for selected or specified periods of time and at selected or specified rates of interest.

17. The educational simulation method of claim 16, wherein said student-participants can further participate in mergers and acquisitions using simulated data relating to earnings per share and other relative indicators of value of said business.

18. The educational simulation method of claim 1, further comprising dynamic graph features as means for said teacher-instructors and said student-participants to chart portfolio growth, transaction history, stock prices and other types of data presented in said simulation exercise.

19. The educational simulation method of claim 1, wherein said teacher-user's selecting or creating the essential criteria (ie. "assignments") of a business plan for students to complete further comprises:
    said teacher-user selecting specific, pre-programmed assignments (ex. "Vision Statement") and choosing to not select others such that those assignments selected will be visible to students and expected to be completed by students to define a business plan;
    said teacher-user further creating a customized, unique assignment to be shared with students comprising the steps:
    a) The teacher-user inputs the name of the assignment;
    b) The teacher user inputs additional information to describe the purpose and directions of the assignment; and
    c) The teacher user inputs specific questions to be associated with that assignment;
    wherein said teacher user's may create multiple customized assignments.

20. The educational simulation method of claim 1, wherein management and adaptation of the individual portfolio occurs through the student-user utilizing web-based computer inputs to:
    a) buy and sell shares of stock for the companies in the simulation through a "Trade Now" page by:
       1) selecting the desired company to be bought/sold;
       2) inputting the desired number of shares in this transaction;
       3) receiving/understanding a notification that an automatic broker fee will be attached to this transaction;
       4) previewing the transaction, including the cost of the transaction and the overall cash flow prior to and after the transaction;
       5) clicking "confirm" to put the transaction into the simulation's system (and subsequent modifications to the share price and student portfolio);
    b) initiating a loan or deposit through a "Bank Now" page by:
       1) selecting either "loan" or "deposit";
       2) selecting the length of the loan from the pre-determined options (ex. "3 days" or "6 days"); and
       3) reviewing the terms of the loan/deposit, which include the matured dollar amount.

21. The educational simulation method of claim 1, wherein adding dynamic news into the simulation is provided for forcing student-users to adjust their business plan and investment portfolio, wherein news (real or fictional) shared directly from the instructor, input into the web-based fields to display for student-users automatically adds news stories to the simulation and automatically adjusts the share prices of specific companies who would be affected by the news.

* * * * *